US012742864B2

(12) United States Patent
Shi

(10) Patent No.: US 12,742,864 B2
(45) Date of Patent: Sep. 22, 2026

(54) LiDAR PERFORMANCE DETECTION METHOD, RELATED DEVICE AND COMPUTER STORAGE MEDIUM

(71) Applicant: SUTENG INNOVATION TECHNOLOGY CO., LTD., Shenzhen (CN)

(72) Inventor: Zhaohui Shi, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1011 days.

(21) Appl. No.: 17/967,003

(22) Filed: Oct. 17, 2022

(65) Prior Publication Data

US 2023/0121544 A1 Apr. 20, 2023

(30) Foreign Application Priority Data

Oct. 19, 2021 (CN) ........................ 202111217808.1

(51) Int. Cl.
*G01S 7/00* (2006.01)
*G01S 7/48* (2006.01)
*G01S 7/487* (2006.01)

(52) U.S. Cl.
CPC .......... *G01S 7/4873* (2013.01); *G01S 7/4802* (2013.01)

(58) Field of Classification Search
USPC ........................................................ 356/4.01
See application file for complete search history.

(56) References Cited

U.S. PATENT DOCUMENTS

2020/0124711 A1* 4/2020 Rezk .................... G01S 7/4811
2021/0025997 A1 1/2021 Rosenzweig et al.
2022/0003846 A1* 1/2022 Massoud ................ G01S 7/484
2022/0268904 A1 8/2022 Zhao et al.

FOREIGN PATENT DOCUMENTS

WO 2021088313 A1 5/2021

OTHER PUBLICATIONS

European Search Report issued in related European Application No. 22202484.6, mailed Jan. 31, 2023, 11 pages.

* cited by examiner

*Primary Examiner* — James R Hulka
(74) *Attorney, Agent, or Firm* — BAYES PLLC

(57) ABSTRACT

A LiDAR performance detection method, a device, and a computer storage medium are provided. The method includes: acquiring a target signal in a target monitoring mode within a blanking interval; determining a measurement value in the target monitoring mode based on the target signal in the target monitoring mode within the blanking interval; and determining that the transceiver module of the LiDAR is abnormal when the measurement value in the target monitoring mode is not within a preset range.

12 Claims, 14 Drawing Sheets

LiDAR PERFORMANCE DETECTION METHOD, RELATED DEVICE AND COMPUTER STORAGE MEDIUM

CROSS-REFERENCE TO RELATED APPLICATION

The present application claims the benefit of priority to China Patent Application No. CN202111217808.1, filed on Oct. 19, 2021, the content of which is incorporated herein by reference in its entirety.

TECHNICAL FIELD

The present application relates to the technical field of LiDAR, and in particular to a LiDAR performance detection method, a related device, and a computer storage medium.

BACKGROUND

The existing detection method for the performance of LiDARs mostly adopts a point cloud post-processing mode. Namely, the average point output rate (obtained by comparison of a number of points in an effective distance and a theoretical number of points) of the point cloud of the whole scene is analyzed, and when the average point output rate within a time period is lower than the theoretical value, the LiDAR gives a warning of performance degradation.

SUMMARY

The embodiments of the present application provide a LiDAR performance detection method, a related device, and a computer storage medium.

In a first aspect, an embodiment of the present application provides a LiDAR performance detection method, applied to a blanking interval, wherein the blanking interval is configured to indicate a time interval from the completion of scanning of first frame data to the beginning of scanning of second frame data by a LiDAR, and the method includes:

- acquiring a target signal in a target monitoring mode within the blanking interval;
- determining a measurement value in the target monitoring mode based on the target signal in the target monitoring mode within the blanking interval; and
- determining that a transceiver module of the LiDAR is abnormal when the measurement value in the target monitoring mode is not within a preset range.

In a second aspect, an embodiment of the present application provides a LiDAR performance detection device, applied to a blanking interval, wherein the blanking interval is configured to indicate a time interval from the completion of scanning of first frame data to the beginning of scanning of second frame data by a LiDAR, and the device includes:

- an acquisition module, configured to acquire a target signal in a target monitoring mode within the blanking interval;
- a first determination module, configured to determine a measurement value in the target monitoring mode based on the target signal in the target monitoring mode within the blanking interval; and
- a second determination module, configured to determine that a transceiver module of the LiDAR is abnormal when the measurement value in the target monitoring mode is not within a preset range.

In a third aspect, an embodiment of the present application provides a computer storage medium having a plurality of instructions stored thereon, wherein the instructions, when loaded by a processor, are adapted for implementation of the method steps described above.

In a fourth aspect, an embodiment of the present application provides a terminal, which may include a processor and a memory,

- wherein the memory has a computer program stored thereon, and the computer program, when loaded by the processor, is adapted for implementation of the method steps described above.

The beneficial effects brought by the technical solutions provided in some embodiments of the present application at least include the followings.

In the embodiment of the present application, the target signal in the target monitoring mode within the blanking interval can be acquired; the measurement value in the target monitoring mode is determined based on the target signal; the transceiver module of the LiDAR is determined to be abnormal when the measurement value in the target monitoring mode is not within the preset range. Therefore, the performance of the LiDAR is detected within the time interval of the completion of the scanning of each frame data by the LiDAR, so that the accuracy of the next scanning of the target object by the LiDAR is ensured. The performance of the LiDAR can be detected in real time by using the blanking interval in the detection period of the LiDAR, so that the problem that the system sends an alarm signal when the performance of the LiDAR is obviously degraded in the prior art is avoided.

BRIEF DESCRIPTION OF DRAWINGS

In order to more clearly illustrate the technical solutions in the embodiments of the present application, the drawings used in the embodiments will be briefly described below. The drawings in the description below are only some embodiments of the present application, and other drawings can be derived from these drawings by those skilled in the art without making creative efforts.

DETAILED DESCRIPTION

When accompanying drawings are involved in the description below, the same numbers in different drawings represent the same or similar elements, unless otherwise indicated. The modes of implementation described in the following exemplary embodiments do not represent all modes of implementation consistent with the present application. Rather, they are merely examples of devices and methods consistent with certain aspects of the present application detailed in the appended claims.

In the description of the present application, it shall be understood that the terms "first", "second" and the like are used for descriptive purposes only and are not to be construed as indicating or implying relative importance. The specific meanings of the above terms in the present application can be understood according to specific situations by those of ordinary skill in the art. In addition, in the description of the present application, "a plurality of" refers to two or more unless otherwise specified. The term "and/or" describes an associative relationship describing associated objects, and means that there may be three relationships, for example, A and/or B may represent that: A is present alone, A and B are present simultaneously, and B is present alone. The character "/" generally indicates an "or" relationship between the associated objects.

Figure 1:
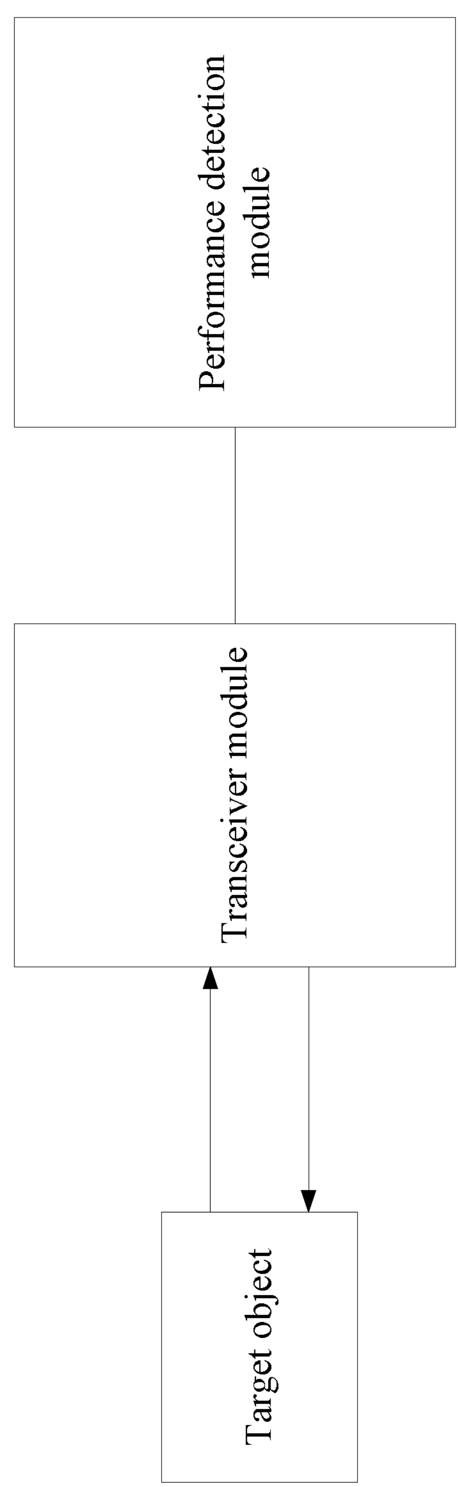
FIG. 1 is a diagram of an application scene of a LiDAR performance detection method according to an embodiment of the present application.

FIG. 1 exemplarily shows a diagram of an application scene of a LiDAR performance detection method according to an embodiment of the present application, which may include: a target object, a transceiver module, and a performance detection module. In the figure, the transceiver module is configured to transmit a photon signal and receive a laser echo signal reflected by the target object. The performance detection module may be configured to collect multiple target signals in the transceiver module and process the target signals, so as to determine whether the LiDAR is in a normal running state or not according to a processing result. For example, the performance detection module may be a field programmable gate array (FPGA) that implements related functions.

The factors influencing a LiDAR's ranging performance during actual detection include: the reduced power of the laser, the abnormal optical preamble cancellation control circuit, the abnormal receiving of a reference voltage, the abnormal receiving of threshold control, the lost receiving reference signal, or the like. It can be understood that if the above factors cause the receiving link in the transceiver module to be abnormal in functions, the ranging performance of the LiDAR will be affected.

The LiDAR performance detection method in the prior art has the following defects: the method for detecting the average point output rate of the point clouds of the target object in the scene within a specific time period includes performing, by a processor, filtering on the acquired point clouds, performing a comparison with a theoretical value, and performing abnormal condition analysis and other processing processes, so that the operation load of the processor may be increased, and real-time monitoring and early warning on possible abnormal conditions cannot be performed. Therefore, the present application provides a LiDAR performance detection method to monitor possible problems in a transceiver module of the LiDAR in real time.

Then, the LiDAR performance detection method according to the embodiment of the present application will be introduced below in combination with the diagram of an application scene of the LiDAR performance detection method in FIG. 1.

Figure 2:
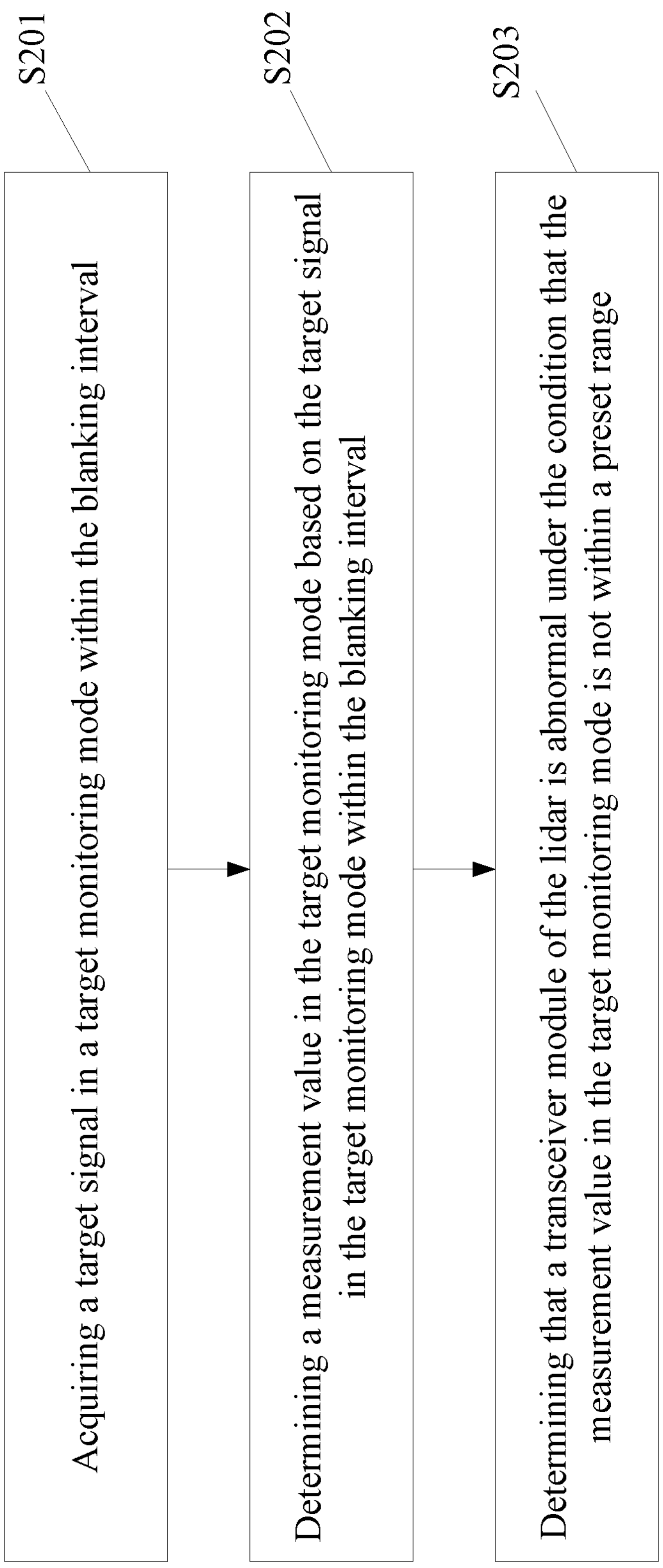
FIG. 2 is a schematic flowchart of a LiDAR performance detection method according to an embodiment of the present application.

In an embodiment, referring to FIG. 2, a schematic flowchart of a LiDAR performance detection method is provided. The LiDAR performance detection method is used in a blanking interval. As shown in FIG. 2, the LiDAR performance detection method may include the following steps.

In S201, a target signal in a target monitoring mode within the blanking interval is acquired.

The blanking interval is configured to indicate a time interval from the completion of scanning of first frame data to the beginning of scanning of second frame data by a LiDAR. For example, the detection period of the LiDAR is 100 ms, the LiDAR completes the scanning of the first frame data of multiple target objects in the scene within a time period of 0-90 ms, and the blanking interval is 90-100 ms. That is, a time interval from the completion of scanning of the first frame data to the beginning of scanning of the second frame data. Taking the MEMS-based LiDAR as an example, the blanking interval refers to a process in which a galvanometer of the MEMS completes one vibration and returns from the end position to the start position.

The target monitoring mode includes any one or more of a reference signal monitoring mode, a first optical preamble monitoring mode, or a second optical preamble monitoring mode. The reference signal monitoring mode is turning off a laser and an optical receiving device of the transceiver module and determining whether a transmitting circuit and a receiving circuit in the transceiver module are conducted or not; the first optical preamble monitoring mode is turning on a laser and turning off a cancellation circuit and determining whether a transmitting circuit is in a failure mode or not; the second optical preamble monitoring mode is turning on the laser and turning on the cancellation circuit and determining whether the cancellation circuit is abnormal or not. The transceiver module may include a laser, an optical receiving device, a transmitting circuit, and a receiving circuit.

In some embodiments, the optical receiving device may be an optical receiving sensor. The receiving circuit may include a cancellation circuit configured to reduce the effect of the ambient light noise signal on the laser echo signal.

It can be understood that in the embodiments of the present application, when the reference signal monitoring mode, the first optical preamble monitoring mode, and the second optical preamble monitoring mode are all normal, the baseline voltage monitoring mode may also be performed within the blanking interval. In some embodiments, the baseline voltage monitoring mode is determining the ambient light noise signal when the laser is turned off.

In S202, a measurement value in the target monitoring mode is determined based on the target signal in the target monitoring mode within the blanking interval.

The target signal is configured to indicate a signal generated by the transceiver module in the target monitoring mode, for example, a transmission reference signal generated by the transceiver module in the reference signal monitoring mode. The measurement value is used to indicate data generated based on the target signal, for example, ranging values and/or waveform areas generated by the processor after the optical receiving device responds to produce an electrical signal based on the transmission reference signal in the reference signal monitoring mode.

Figure 3:
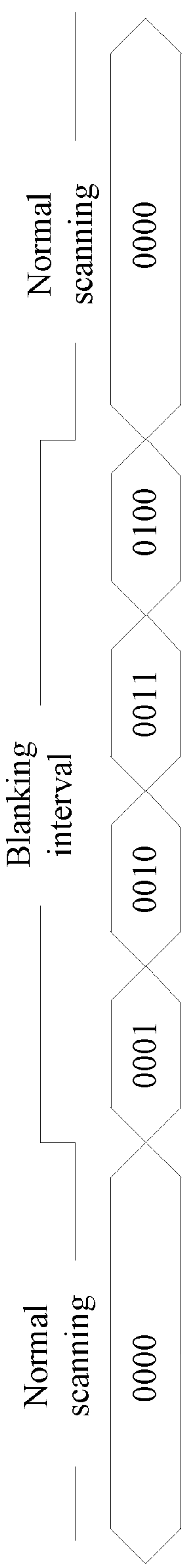
FIG. 3 is a diagram of a working mode of a LiDAR performance detection method according to an embodiment of the present application.

In some embodiments, referring to FIG. 3, in the embodiment of the present application, after the completion of the normal scanning mode 0000 for the target object in one scanning process, the performance of the LiDAR may be detected within the blanking interval (remaining time period). For example, the reference signal monitoring mode is completed in the 0001 stage, the first optical preamble monitoring mode is completed in the 0010 stage, the second optical preamble monitoring mode is completed in the 0011 stage, and the baseline voltage monitoring mode is completed in the 0100 stage.

Furthermore, referring to Table 1, in the normal scanning mode 0000, the distance between the LiDAR and the target object may be determined by the time when the photon signal emitted by the laser is acquired and the time when the laser echo signal is received, i.e., the measurement value is the target distance value. In the reference signal monitoring mode 0001, a first ranging value and a first waveform area value may be obtained through the transmission reference signal. In the first optical preamble monitoring mode 0010, a second ranging value and a second waveform area value may be obtained through the photon signal. In the second optical preamble monitoring mode 0011, a third ranging value and a third waveform area value may be obtained through the photon signal. In the baseline voltage monitoring mode 0100, the amount of ambient light noise can be determined from the ambient light noise signal.

TABLE 1

| Coding | Working mode | Target signal | Measurement value |
|---|---|---|---|
| 0000 | Normal scanning mode | Photon signal and laser echo signal | Target distance value |
| 0001 | Reference signal monitoring mode | Transmission reference signal | First ranging value and first waveform area value |
| 0010 | First optical preamble monitoring mode | Laser echo signal | Second ranging value and second waveform area value |
| 0011 | Second optical preamble monitoring mode | Laser echo signal | Third ranging value and third waveform area value |
| 0100 | Baseline voltage monitoring mode | Ambient light noise signal | Amount of ambient light noise |

In S203, a transceiver module of the LiDAR is determined to be abnormal when the measurement value in the target monitoring mode is not within a preset range.

When abnormal data exist in the transceiver module of the LiDAR and before a fault code corresponding to the abnormal data is reported, fault debouncing processing may also be performed to eliminate false triggering of a fault in the embodiment of the present application.

In the embodiment of the present application, the target signal of each time in the first preset number in the target monitoring mode can be acquired, and the measurement value of the target signal of each time is determined; the transceiver module of the LiDAR is determined to be abnormal when the total number of times the measurement value is not within the preset range is greater than a second preset number. The first preset number is greater than the second preset number.

For example, the first preset number may be set to 5 and the second preset number may be set to 2. Within a blanking interval after the LiDAR completes a normal scanning mode on a target object, if a reference waveform generated in the reference signal monitoring mode is abnormal, the performance of the LiDAR in the reference signal monitoring mode is repeatedly detected for 4 times. If the number of times for generating an abnormal reference waveform is 3 (greater than the second preset number which is 2), it can be determined that the transceiver module of the LiDAR is abnormal, and a fault code corresponding to abnormal data needs to be reported, so that the possibility of false triggering of a fault can be eliminated, and the detection accuracy is improved.

After the transceiver module of the LiDAR is determined to be abnormal, the LiDAR performance detection method of the present application also includes sending a prompt signal.

In the embodiment of the present application, the target signal in the target monitoring mode within the blanking interval can be acquired; the measurement value in the target monitoring mode is determined based on the target signal in the target monitoring mode within the blanking interval; the transceiver module of the LiDAR is determined to be abnormal when the measurement value in the target monitoring mode is not within the preset range. Therefore, the performance of the LiDAR is detected within the time interval from the completion of the scanning of the first frame data to the beginning of the scanning of the second frame data by the LiDAR, so that the accuracy of the next scanning of the target object by the LiDAR is ensured. The performance of the LiDAR can be detected in real time by using the blanking interval in the detection period of the LiDAR, thus avoiding the problem in the prior art that the system sends an alarm signal when the performance of the LiDAR is obviously degraded.

Figure 4:
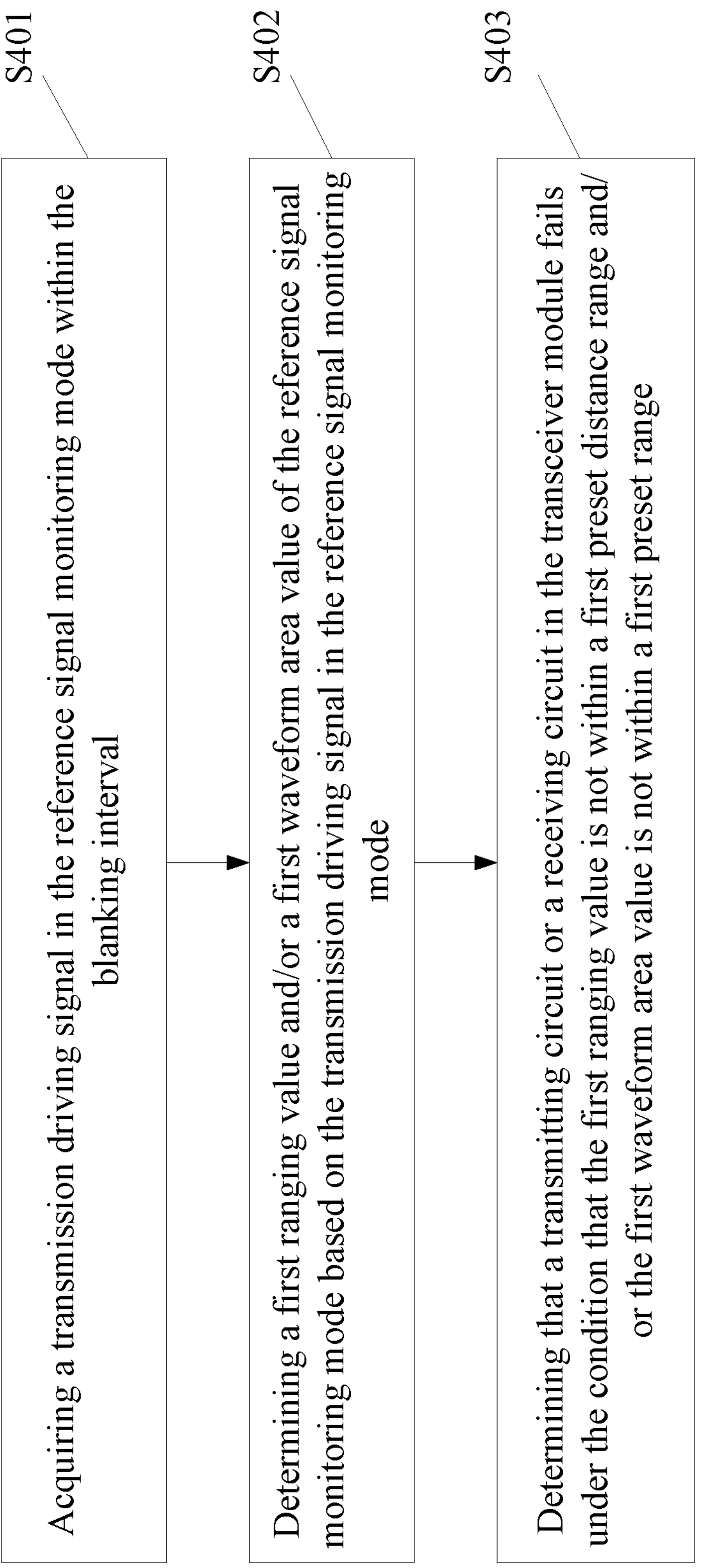
FIG. 4 is a schematic flowchart of another LiDAR performance detection method according to an embodiment of the present application.

In some embodiments, FIG. 4 exemplarily shows a schematic flowchart of a LiDAR performance detection method according to an embodiment of the present application. When the target monitoring mode includes the reference signal monitoring mode, as shown in FIG. 4, the LiDAR performance detection method may include the following steps.

In S401, a transmission reference signal in the reference signal monitoring mode within the blanking interval is acquired.

The reference signal monitoring mode in the embodiment of the present application is configured to determine whether a link formed by a transmitting unit and a receiving unit in the transceiver module can be conducted or not. The transmission reference signal is a signal configured to drive each unit in the transceiver module to work.

In S402, a first ranging value and/or a first waveform area value of the reference signal monitoring mode is determined based on the transmission driving signal in the reference signal monitoring mode.

The first ranging value is used to indicate a distance generated based on the transmission reference signal received by the optical receiving device; the first waveform area value is used to indicate an area value of a waveform generated based on the transmission reference signal received by the optical receiving device.

In S403, the transceiver module is determined to be abnormal when the first ranging value is not within the first preset distance range and/or the first waveform area value is not within the first preset area range.

The failure of the transceiver module may be particularly a failure of the transmitting circuit or an anomaly of the receiving circuit in the transceiver module.

Figure 5:
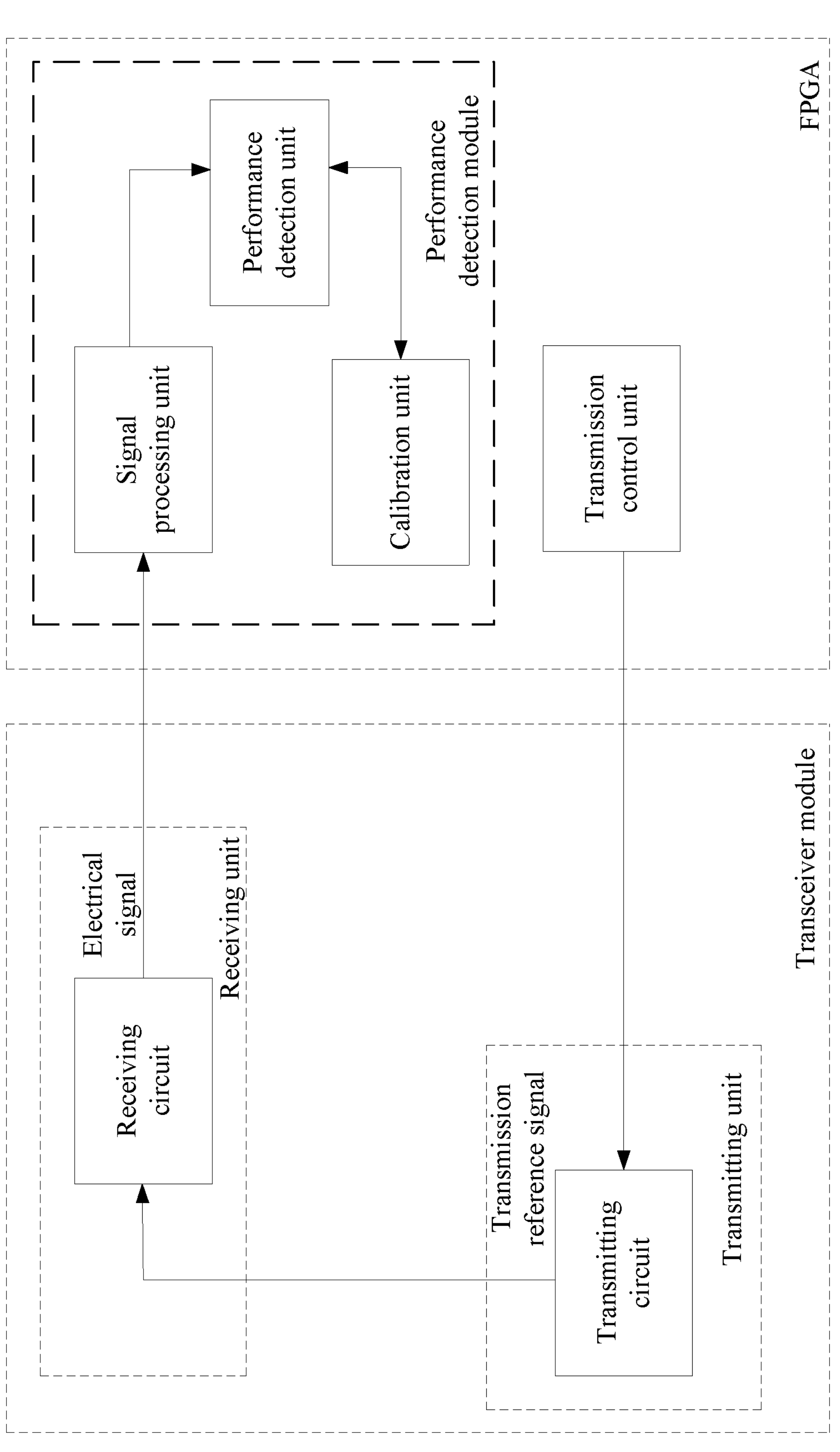
FIG. 5 is a schematic diagram of a reference signal monitoring mode of another LiDAR performance detection method according to an embodiment of the present application.

Referring to FIG. 5, a schematic diagram of a reference signal monitoring mode is provided, wherein the transmission control unit is configured to output a transmission reference signal, the transmission reference signal passes through the transmitting circuit to the receiving circuit, the receiving circuit generates an electrical signal after responding to the transmission reference signal, and after the electrical signal is processed by the signal processing unit, the first distance and the first waveform area information corresponding to the transmission reference signal can be obtained. Furthermore, the performance detection unit may compare the first distance and the first waveform area information with calibration data (i.e., the first preset area range) pre-stored in the calibration unit. When the first distance and the first waveform area information are not within the calibration data range, it can be determined that the transceiver module has a fault in the reference signal monitoring mode, a link formed by the transmitting circuit and the receiving circuit in the transceiver module cannot be normally conducted, and possibly the transmitting circuit and/or the receiving circuit in the transceiver module fails.

In an example, the transmission control unit controls the transmitting circuit to output the transmission reference signal 5V to the receiving circuit. The receiving circuit generates a pulse signal (electrical signal) in response to the transmission reference signal 5V, and the pulse signal is processed by an analog-to-digital converter (ADC) and filtering, so as to obtain a first distance of 0.2 m and a first waveform area of 10 $cm^2$ corresponding to the transmission reference signal 5V. Furthermore, the detection performance unit may compare the first distance of 0.2 m and the first waveform area of 8 $cm^2$ with calibration data pre-stored in the calibration unit: a first calibration distance of 0.3 m and a first calibration area of 10 $cm^2$. Since the first distance of 0.2 m<the first calibration distance of 0.3 m and the first waveform area of 8 $cm^2$<the first calibration area of 10 $cm^2$, it can be considered that the transceiver module of the LiDAR is normal in the reference signal monitoring mode, that is, the transmitting circuit and the receiving circuit in the transceiver module can be conducted.

Therefore, according to the embodiment of the present application, whether the transmitting circuit and the receiving circuit in the transceiver module can be normally conducted or not can be determined by setting the reference signal monitoring mode within the blanking interval. If the link cannot be normally conducted, an abnormity prompt of link data in the transceiver module can be directly sent to the processor of the LiDAR, so that the detection efficiency of the performance of the LiDAR is improved, and the detection of other irrelevant devices (such as a laser) in the follow-up maintenance process is also avoided.

Figure 6:
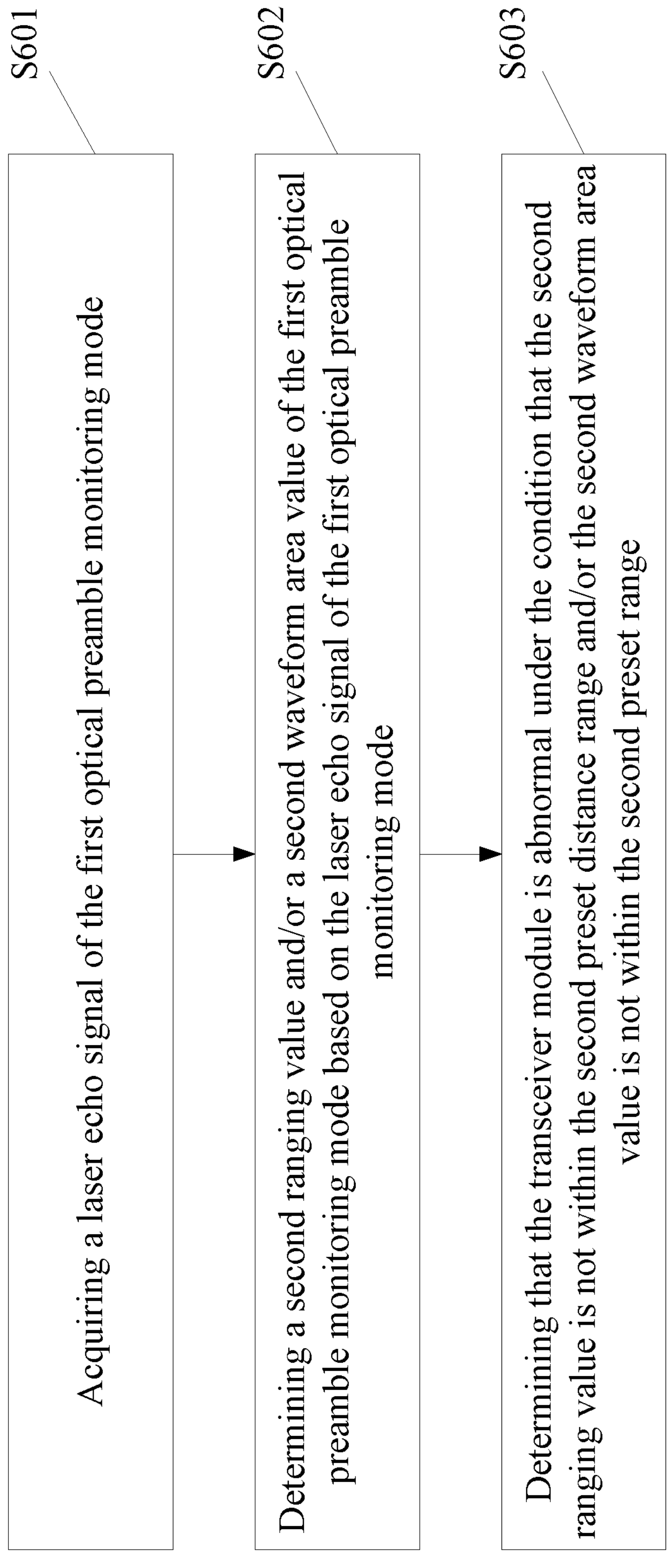
FIG. 6 is a schematic flowchart of still another LiDAR performance detection method according to an embodiment of the present application.

In some embodiments, FIG. 6 exemplarily shows a schematic flowchart of a LiDAR performance detection method according to an embodiment of the present application. When the target monitoring mode may include the first optical preamble monitoring mode, as shown in FIG. 6, the LiDAR performance detection method may include the following steps.

In S601, a laser echo signal of the first optical preamble monitoring mode is acquired.

The transmitting unit may include a laser and a transmitting circuit, and the receiving unit may include an optical receiving device and a receiving circuit, wherein the receiving circuit includes a cancellation circuit. The cancellation circuit is configured to reduce the influence of the ambient light noise signal on the laser echo signal. Furthermore, the first optical preamble monitoring mode is turning on the laser and turning off the cancellation circuit.

In S602, a second ranging value and/or a second waveform area value of the first optical preamble monitoring mode is determined based on the laser echo signal of the first optical preamble monitoring mode.

The second ranging value is used to indicate a distance generated based on the laser echo signal received by the optical receiving device in the first optical preamble monitoring mode; the second waveform area value is used to indicate an area value of a waveform generated based on the laser echo signal received by the optical receiving device in the first optical preamble monitoring mode.

In S603, the transceiver module is determined to be abnormal when the second ranging value is not within the second preset distance range and/or the second waveform area value is not within the second preset area range.

When the first optical preamble mode is performed alone and when the transceiver module is determined to be abnormal, it may be a failure or performance degradation of the transmitting circuit, a failure or performance degradation of the laser, a failure or performance degradation of the optical receiving device, or a failure or performance degradation of the receiving circuit.

Figure 7:
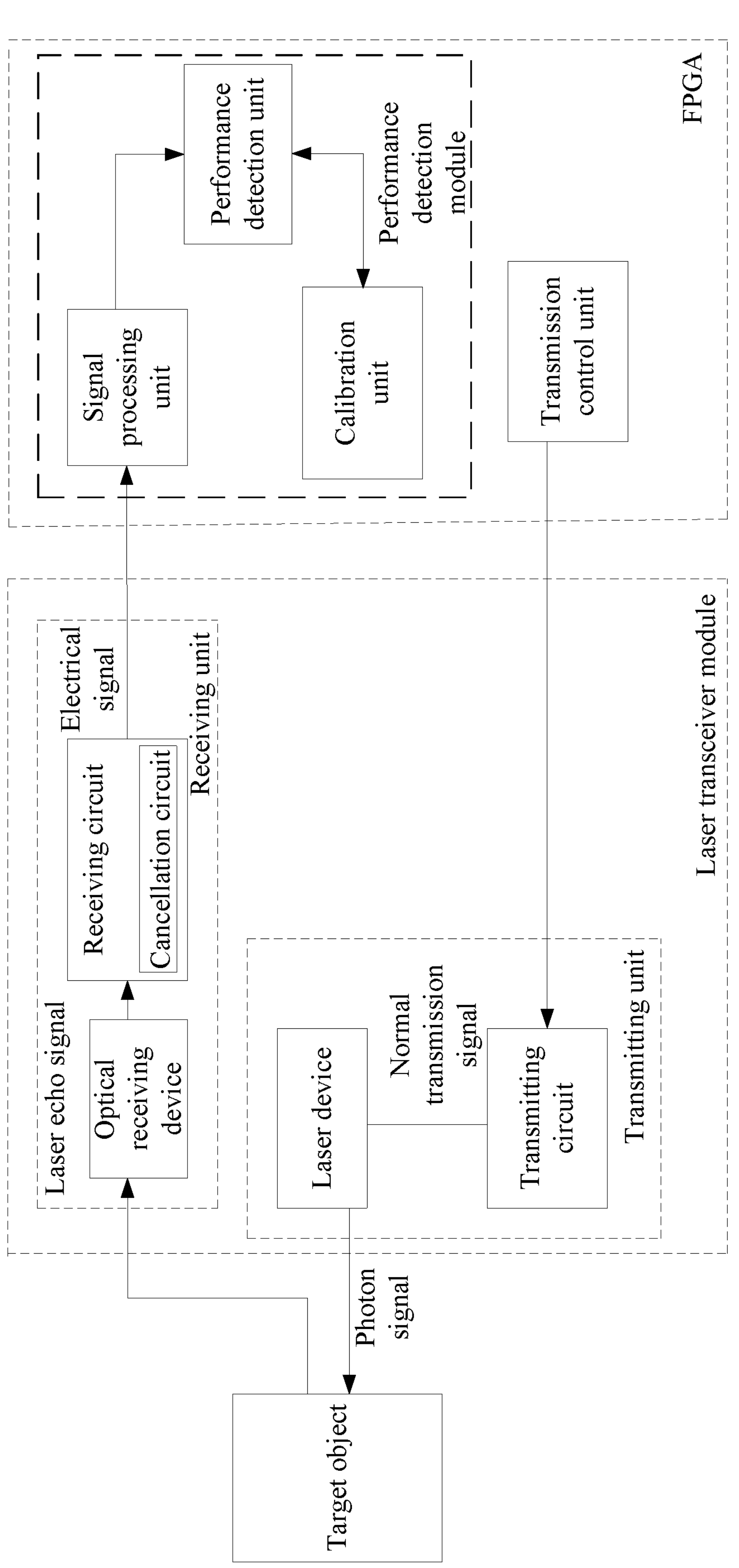
FIG. 7 is a schematic diagram of an optical preamble monitoring mode of still another LiDAR performance detection method according to an embodiment of the present application.

Referring to FIG. 7, a schematic diagram of an optical preamble monitoring mode is provided, wherein the transmitting circuit outputs a normal transmitting signal to the laser. After the laser device sends a photon signal to the target object, the target object reflects a laser echo signal to the optical receiving device, the optical receiving device generates an electrical signal after responding to the laser echo signal. And after the electrical signal is processed by the signal processing unit, the second distance and the second waveform area information corresponding to the laser echo signal can be obtained. Furthermore, the performance detection unit may compare the second distance and the second waveform area information with calibration data (i.e., the second preset area range) pre-stored in the calibration unit, and when the second distance and the second waveform area information are not within the calibration data range, it can be determined that the transceiver module has a fault in the first optical preamble monitoring mode.

In an example, the transmitting circuit outputs a normal transmitting signal 20V to a laser diode (laser device). After the laser diode sends a photon signal to a building (target object) in the scene, the building reflects a laser echo signal to an echo detector (optical receiving device), and the echo detector generates a pulse signal (electric signal) after responding to the laser echo signal. After the pulse signal is processed by an analog-to-digital converter (ADC) and filtering, a second distance of 25 m and a second waveform area of 210 $cm^2$ corresponding to the laser echo signal can be obtained. Furthermore, the detection performance unit may compare the second distance of 25 m and the second waveform area of 210 $cm^2$ with the calibration data pre-stored in the calibration unit: a second calibration distance of 30 m and a second calibration area of 200 $cm^2$. Since the second distance of 25 m<the second calibration distance of 30 m but the second waveform area of 210 $cm^2$>the second calibration area of 200 $cm^2$, it can be considered that the transceiver module of the LiDAR is abnormal in the first optical preamble monitoring mode.

Therefore, whether the transceiver module is normal or not can be determined by setting the first optical preamble monitoring mode within the blanking interval, and if the second distance and/or the second waveform area generated by the signal processing unit is abnormal, an abnormality prompt can be directly sent to a processor of the LiDAR, so that the detection efficiency of the performance of the LiDAR can be improved.

Figure 8:
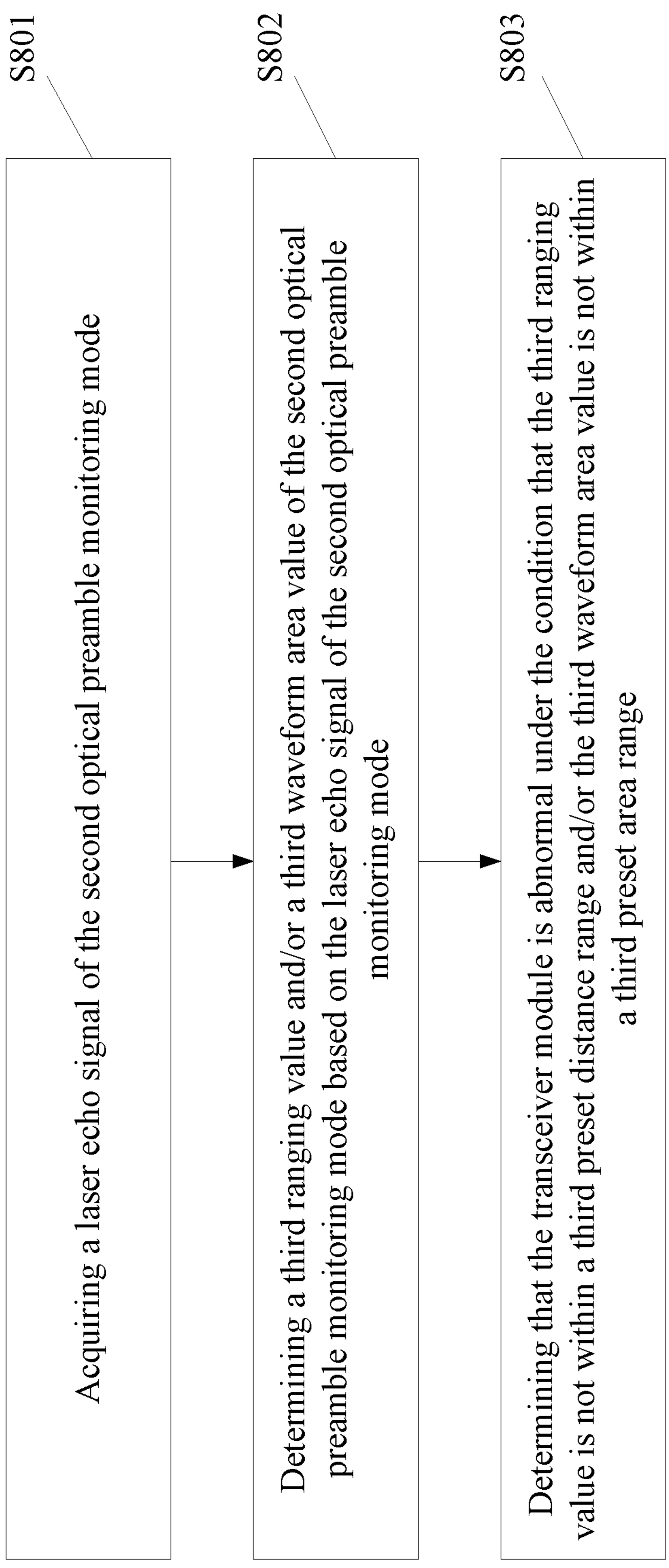
FIG. 8 is a schematic flowchart of yet another LiDAR performance detection method according to an embodiment of the present application.
Figure 9:
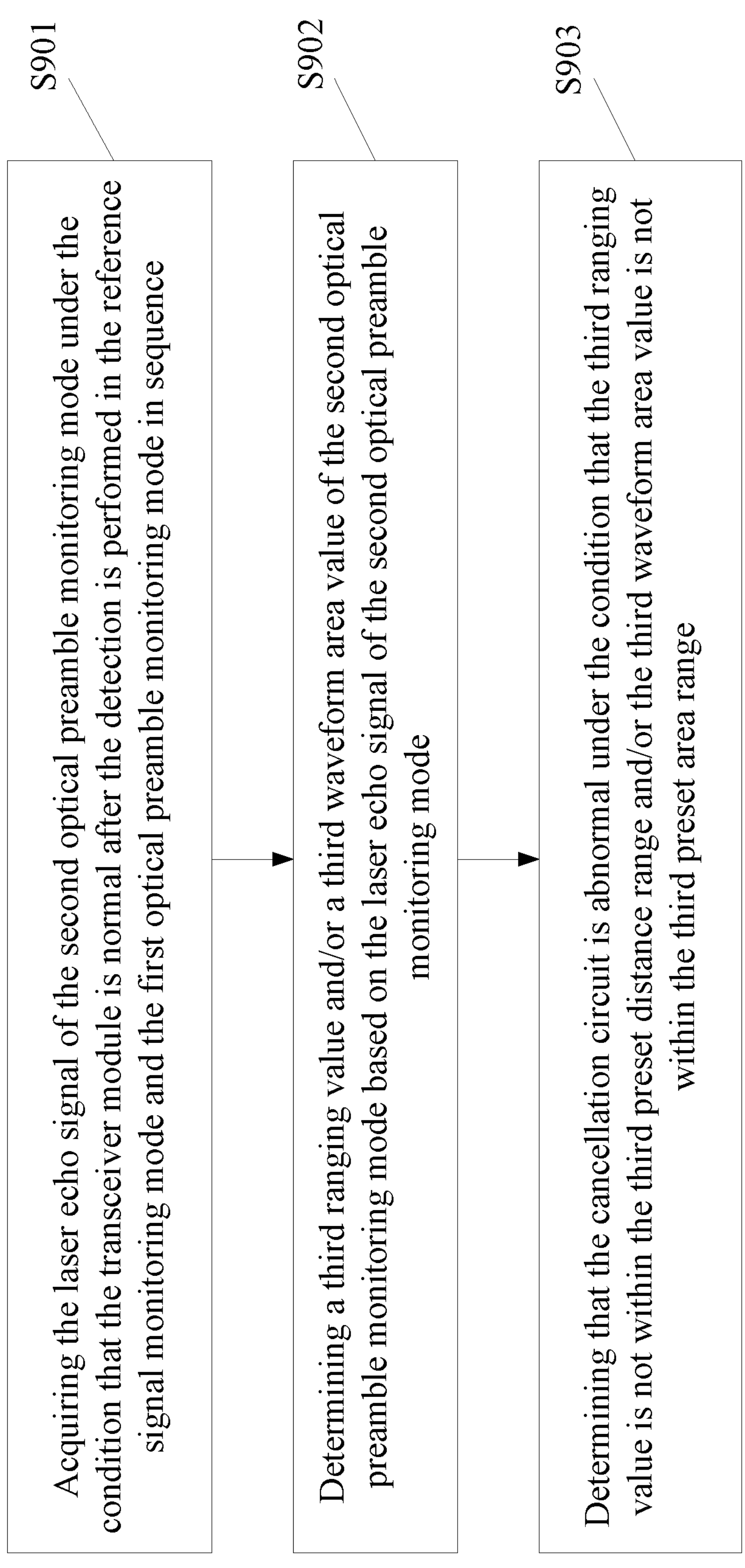
FIG. 9 is a schematic flowchart of still another LiDAR performance detection method according to an embodiment of the present application.

In some embodiments, FIG. 8 exemplarily shows a schematic flowchart of a LiDAR performance detection method according to an embodiment of the present application. When the target monitoring mode may be the second optical preamble monitoring mode, as shown in FIG. 8, the LiDAR performance detection method may include the following steps.

In S801, a laser echo signal of the second optical preamble monitoring mode is acquired.

In the embodiment of the present application, the second optical preamble monitoring mode is turning on the laser and turning on the cancellation circuit.

In S802, a third ranging value and/or a third waveform area value of the second optical preamble monitoring mode is determined based on the laser echo signal of the second optical preamble monitoring mode.

The third ranging value is used to indicate a distance generated based on the laser echo signal received by the optical receiving device in the second optical preamble monitoring mode; the third waveform area value is used to indicate an area value of a waveform generated based on the laser echo signal received by the optical receiving device in the second optical preamble monitoring mode.

In S803, the transceiver module is determined to be abnormal when the third ranging value is not within a third preset distance range and/or the third waveform area value is not within a third preset area range.

It can be understood that if the detection is performed in the second optical preamble monitoring mode alone, when the transceiver module is determined to be abnormal, it may be a failure or performance degradation of the transmitting circuit, a failure or performance degradation of the laser, a failure or performance degradation of the optical receiving device, a failure or performance degradation of the receiving circuit, or a failure of the cancellation circuit.

After the detection of the reference signal monitoring mode, the transceiver module is normal, and if the detection of the second optical preamble mode is abnormal, the transceiver module in the second optical preamble mode is abnormal. In some embodiments, there may be a failure or performance degradation of one or more of the laser in the transmitting unit, the optical receiving device in the receiving unit, the cancellation circuit, and the receiving circuit.

It can be understood that after the detection is performed in the first optical preamble mode, the transceiver module is normal, and when an abnormality is detected in the second optical preamble mode, it can be determined that the cancellation circuit in the transceiver module is abnormal.

Similarly, when the transceiver module is normal after the detection is performed in the reference signal monitoring mode and the first optical preamble mode in sequence, and when an abnormality is detected in the second optical preamble mode, it can be determined that the cancellation circuit in the transceiver module is abnormal. Therefore, in the embodiment of the present application, whether the parts except for the cancellation circuit in the laser, the transmitting circuit, the receiver, and the receiving circuit in the transceiver module are abnormal or not can be determined in the first optical preamble monitoring mode, and then whether the cancellation circuit is abnormal or not can be determined in the second optical preamble monitoring mode. According to the embodiment of the present application, the first optical preamble monitoring mode and the second optical preamble monitoring mode are combined to detect the abnormity of the transceiver module, so that the performance detection efficiency of the LiDAR is improved, and the abnormal data generation unit can be more accurately positioned.

Referring to FIG. 7, the transmitting circuit outputs a normal transmission driving signal to the laser device. After the laser transmitting device sends a photon signal to the target object, the target object reflects a laser echo signal to the optical receiving device, and the optical receiving device generates an electrical signal after responding to the laser echo signal. The cancellation circuit cancels the electrical signal generated by the ambient light noise, and then inputs the electrical signal to the signal processing unit. The signal processing unit processes the electrical signal to obtain the third distance and the third waveform area information corresponding to the laser echo signal. Furthermore, the performance detection unit may compare the third distance and the third waveform area information with calibration data (i.e., the third preset area range) pre-stored in the calibration unit. When the third distance and the third waveform area information are not within the calibration data range, it can be determined that the transceiver module has a fault in the second optical preamble monitoring mode.

In an example, the transmitting circuit outputs a normal transmitting signal 20V to a laser diode (laser device). After the laser diode sends a photon signal to a building (target object) in the scene, the building reflects a laser echo signal to an echo detector (optical receiving device), and the echo detector generates a pulse signal (electric signal) after responding to the laser echo signal. After the pulse signal is processed by an analog-to-digital converter (ADC) and filtering, a third distance of 20 m and a third waveform area of 170 $cm^2$ corresponding to the laser echo signal can be obtained. Furthermore, the detection performance unit may compare the third distance of 20 m and the third waveform area of 170 $cm^2$ with the calibration data pre-stored in the calibration unit: a third calibration distance of 30 m and a third calibration area of 180 $cm^2$. Since the third distance of 20 m<the third calibration distance of 30 m and the third waveform area of 170 $cm^2$<the third calibration area of 180 $cm^2$, it can be considered that the transceiver module of the LiDAR is normal.

Therefore, whether the transceiver module is normal or not can be determined by setting the second optical preamble monitoring mode within the blanking interval, and if the third distance and/or the third waveform area generated by the signal processing unit is abnormal, an abnormality prompt can be directly sent to a processor of the LiDAR, so that the detection efficiency of the performance of the LiDAR is improved.

Figure 10:
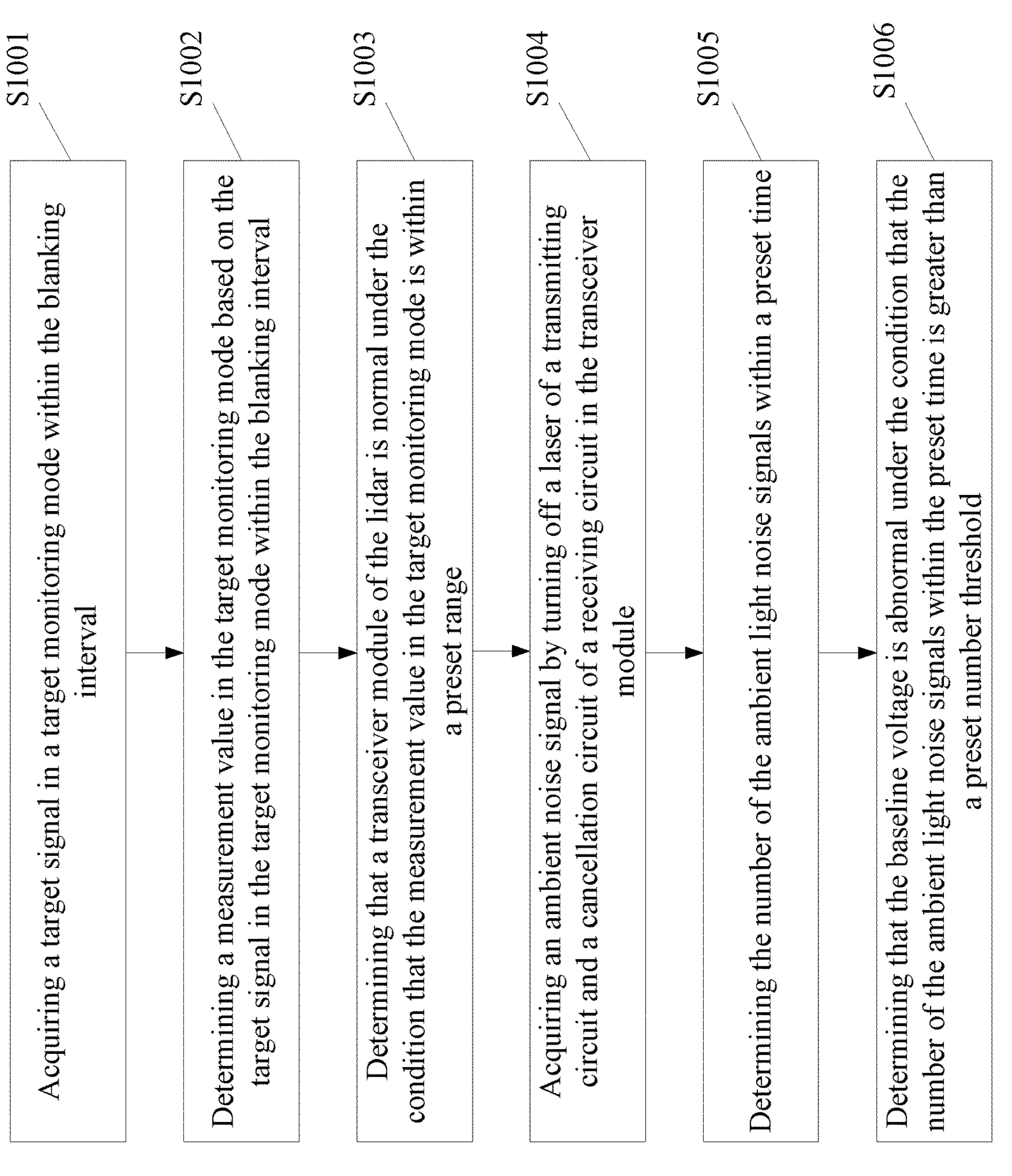
FIG. 10 is a schematic flowchart of another LiDAR performance detection method according to an embodiment of the present application.

In some embodiments, FIG. 10 exemplarily shows a schematic flowchart of a LiDAR performance detection method according to an embodiment of the present application. As shown in FIG. 10, the LiDAR performance detection method may include the following steps.

In S1001, a target signal in a target monitoring mode within the blanking interval is acquired.

In some embodiments, S1001 corresponds to S201, which is not repeated herein.

In S1002, a measurement value in the target monitoring mode is determined based on the target signal in the target monitoring mode within the blanking interval.

In some embodiments, S1002 corresponds to S202, which is not repeated herein.

In S1003, the transceiver module of the LiDAR is determined to be normal when the measurement value in the target monitoring mode is within a preset range.

In the embodiment of the present application, when the measurement value in the target monitoring mode is within the preset range, it can be understood that the transceiver module is normal in the reference signal monitoring mode (the transmitting circuit and the receiving circuit in the transceiver module may be conducted normally), in the first optical preamble monitoring mode (the transmitting circuit, the laser, the receiving circuit, and the optical receiving device are all normal), and in the second optical preamble monitoring mode (the cancellation circuit is normal).

In S1004, an ambient noise signal is acquired by turning off a laser of a transmitting circuit and a cancellation circuit of a receiving circuit in the transceiver module.

In the embodiment of the present invention, when the transceiver module is normal, the detection may also be performed in the baseline voltage monitoring mode, wherein the baseline voltage monitoring mode is turning off the laser and the cancellation circuit and determining the ambient light noise signal.

In the embodiment of the present application, when the transceiver module is normal in the reference signal monitoring mode, the first optical preamble monitoring mode, and the second optical preamble monitoring mode, and when the laser and the cancellation circuit are both turned off, the ambient light noise signal in the scene is acquired by the optical receiving device.

In S1005, the number of the ambient light noise signals within a preset time is determined.

It can be understood that when the laser and the cancellation circuit are both turned off, the optical receiving device may receive the ambient light noise signal, and further determine the number of the ambient light noise signals within the preset time.

In S1006, the baseline voltage is determined to be abnormal when the number of the ambient light noise signals within the preset time is greater than a preset number threshold.

The baseline voltage in the embodiment of the present application is configured to indicate a voltage applied to the optical receiving device in the receiving unit.

In an example, the preset number threshold is 12 and the baseline voltage is 10 V. The echo detector receives an ambient light noise signal in a scene and generates 15 pulse signals within a preset time period of 2 ms. Since the number of ambient light noise signals within the preset time which is 15 is greater than the preset number threshold of 12, it can be determined that the baseline voltage is abnormal, and the processor needs to adjust the baseline voltage applied to the receiving unit, so as to improve the measurement accuracy of the LiDAR.

Therefore, in the embodiment of the present application, whether the baseline voltage applied to the receiving unit is normal or not can be determined by setting the baseline voltage monitoring mode within the blanking interval. If the baseline voltage applied to the receiving unit is abnormal, an abnormality prompt of the baseline voltage can be directly sent to a processor of the LiDAR, so that the detection efficiency of the performance of the LiDAR is improved, and the measurement accuracy of the LiDAR is also improved.

Figure 11:
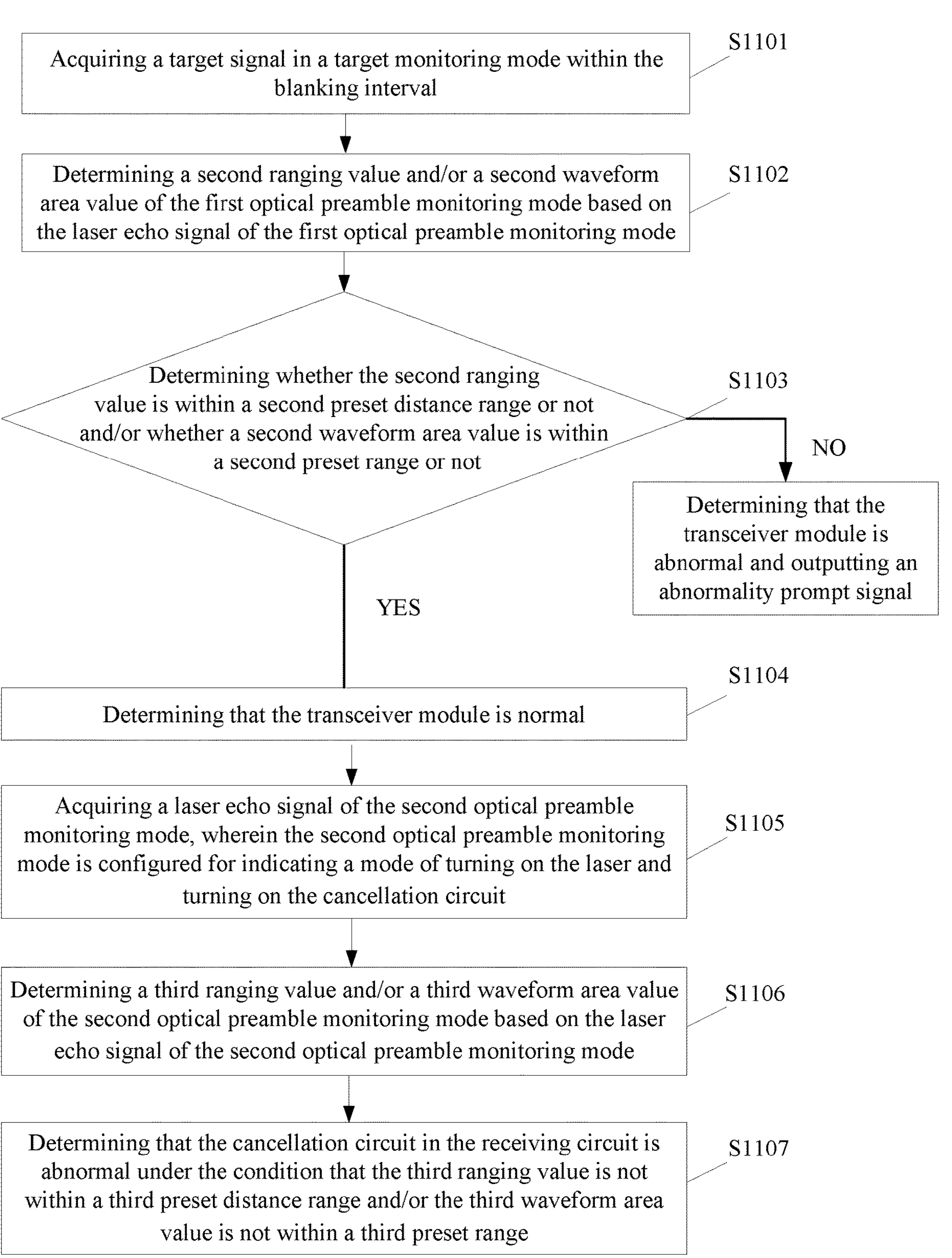
FIG. 11 is a schematic flowchart of still another LiDAR performance detection method according to an embodiment of the present application.

In some embodiments, FIG. 11 exemplarily shows a schematic flowchart of a LiDAR performance detection method according to an embodiment of the present application. As shown in FIG. 11, the LiDAR performance detection method may include the following steps.

In S1101, a laser echo signal of the first optical preamble monitoring mode is acquired.

The transmitting unit may include a laser and a transmitting circuit, and the receiving unit may include an optical receiving device and a receiving circuit, wherein the receiving circuit includes a cancellation circuit. The cancellation circuit is configured to reduce the influence of the ambient light noise signal on the laser echo signal. Furthermore, the first optical preamble monitoring mode is turning on the laser and turning off the cancellation circuit.

In S1102, a second ranging value and/or a second waveform area value of the first optical preamble monitoring mode is determined based on the laser echo signal of the first optical preamble monitoring mode.

In S1103, the transceiver module is determined to be abnormal when the second ranging value is not within the second preset distance range and/or the second waveform area value is not within the second preset area range, and then an abnormality prompt signal is output.

In S1104, the transceiver module is determined to be normal when the second ranging value is within the second preset distance range and/or the second waveform area value is within the second preset area range.

In S1105, a laser echo signal of the second optical preamble monitoring mode is acquired, wherein the second optical preamble monitoring mode is turning on the laser and turning on the cancellation circuit.

In S1106, a third ranging value and/or a third waveform area value of the second optical preamble monitoring mode is determined based on the laser echo signal of the second optical preamble monitoring mode.

In S1107, the cancellation circuit in the receiving circuit is determined to be abnormal when the third ranging value is not within a third preset distance range and/or the third waveform area value is not within a third preset area range.

In the embodiment of the present application, whether the laser, the optical receiving device, the transmitting circuit, and the receiving circuit in the transceiver module are normal or not can be determined by running the first optical preamble monitoring mode firstly. When it is normal in the first optical preamble monitoring mode, whether the cancellation circuit is abnormal or not can be more accurately positioned by running the second optical preamble monitoring mode. The performance detection efficiency of the LiDAR is improved, and whether the cancellation circuit is abnormal or not can also be more accurately positioned when it is normal in the first optical preamble monitoring mode.

Figure 12:
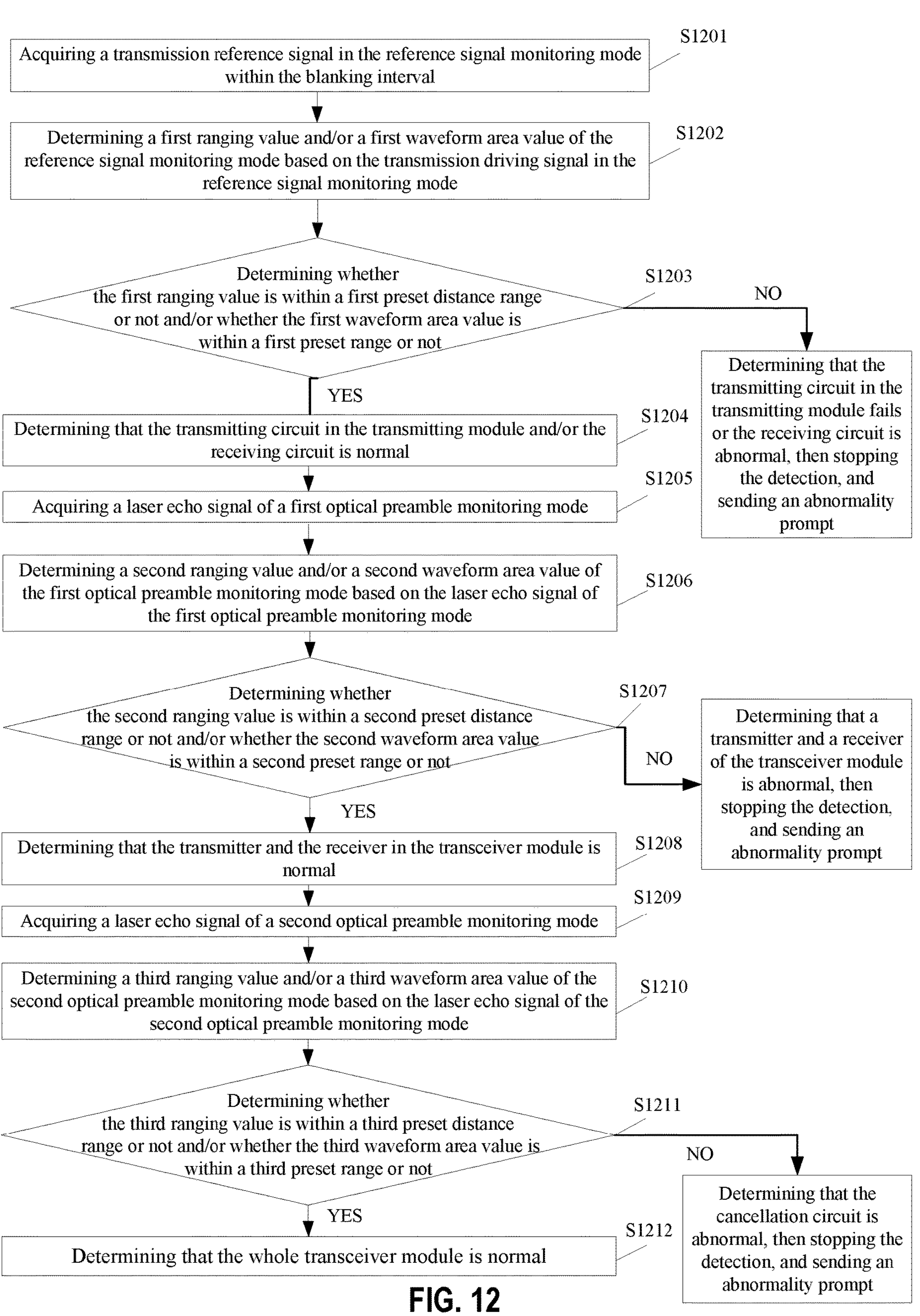
FIG. 12 is a schematic flowchart of another LiDAR performance detection method according to an embodiment of the present application.

In some embodiments, FIG. 12 exemplarily shows a schematic flowchart of a LiDAR performance detection method according to an embodiment of the present application. As shown in FIG. 12, the LiDAR performance detection method may include the following steps.

In S1201, a transmission reference signal in the reference signal monitoring mode within the blanking interval is acquired.

In S1202, a first ranging value and/or a first waveform area value of the reference signal monitoring mode is determined based on the transmission driving signal in the reference signal monitoring mode.

In S1203, the transmitting circuit of the transmitting module is determined to fail or the receiving circuit is determined to be abnormal when the first ranging value is not within the first preset distance range and/or the first waveform area value is not within the first preset area range. Then the detection is stopped, and an abnormality prompt is sent.

In S1204, the transmitting circuit in the transmitting module and/or the receiving circuit is determined to be normal when the first ranging value is within the first preset distance range and/or the first waveform area value is within the first preset area range.

In S1205, a laser echo signal of the first optical preamble monitoring mode is acquired, wherein the first optical preamble monitoring mode is turning on the laser and turning off the cancellation circuit.

In S1206, a second ranging value and/or a second waveform area value of the first optical preamble monitoring mode is determined based on the laser echo signal of the first optical preamble monitoring mode.

In S1207, the transmitter and the receiver in the transceiver module are determined to be abnormal when the second ranging value is not within the second preset distance range and/or the second waveform area value is not within the second preset area range. The detection is stopped, and then an abnormality prompt is sent.

In S1208, the transmitter and the receiver in the transceiver module are determined to be normal when the second ranging value is within the second preset distance range and/or the second waveform area value is within the second preset area range.

In S1209, a laser echo signal of the second optical preamble monitoring mode is acquired.

In the embodiment of the present application, the second optical preamble monitoring mode is turning on the laser and turning on the cancellation circuit.

In S1210, a third ranging value and/or a third waveform area value of the second optical preamble monitoring mode is determined based on the laser echo signal of the second optical preamble monitoring mode.

In S1211, the cancellation circuit is determined to be abnormal when the third ranging value is not within the third preset distance range and/or the third waveform area value is not within the third preset area range. Then the detection is stopped, and an abnormality prompt is sent.

In S1212, the whole transceiver module is determined to be normal when the third ranging value is within the third preset distance range and/or the third waveform area value is within the third preset area range.

According to the embodiment of the present application, by running the reference signal monitoring mode, the first optical preamble monitoring mode, and the second optical preamble monitoring mode in sequence within the blanking interval, the performance detection efficiency of the transceiver module can be improved, a unit for generating abnormal data can also be more accurately positioned, and the detection of other irrelevant devices in the follow-up maintenance process is avoided.

As an exemplary implementation, in the above embodiment, when the transceiver module is detected to be normal, the method also includes: acquiring an ambient noise signal by turning off a laser of a transmitting circuit and a cancellation circuit of a receiving circuit in the transceiver module; determining the number of the ambient light noise signals within a preset time; determining that the baseline voltage is abnormal when the number of the ambient light noise signals within the preset time is greater than a preset number threshold, and sending an abnormality prompt; and determining that the baseline voltage is normal when the number of the ambient light noise signals within the preset time is not greater than a preset number threshold.

As an exemplary implementation, in the embodiment of the present application, the method also includes: acquiring target signals of a first preset number in a corresponding monitoring mode and determining a measurement value of a target signal of each time when an abnormality is detected in data, determining that an abnormality exists in the LiDAR when the total number of times the measurement value is not within the preset range is greater than a second preset number, then stopping the detection, and sending an abnormality prompt. The first preset number is greater than the second preset number.

Figure 13:
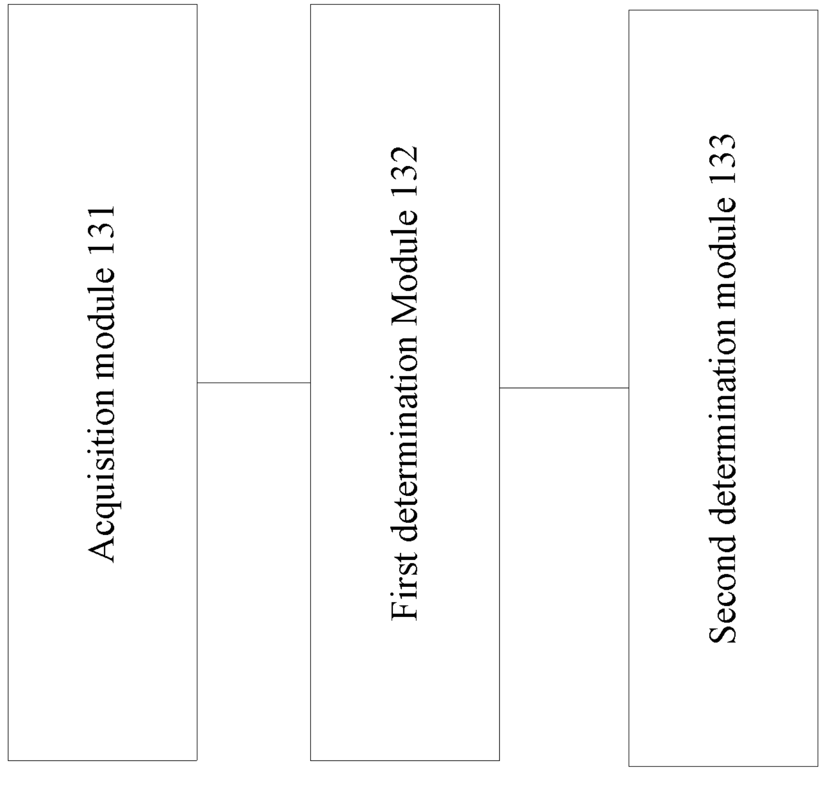
FIG. 13 is a schematic structural diagram of a LiDAR performance detection device according to an embodiment of the present application.

FIG. 13 is a schematic structural diagram of a LiDAR performance detection device according to an exemplary embodiment of the present application. The device is applied to a blanking interval, wherein the blanking interval is configured to indicate a time interval from the completion of scanning of first frame data to the beginning of scanning of second frame data by a LiDAR, and the device executes the performance detection of the LiDAR in any above embodiment of the present application. As shown in FIG. 13, the LiDAR performance detection device may include:

an acquisition module 131, configured to acquire a target signal in a target monitoring mode within the blanking interval;

a first determination module 132, configured to determine a measurement value in the target monitoring mode based on the target signal in the target monitoring mode within the blanking interval; and a second determination module 133, configured to determine that a transceiver module of the LiDAR is abnormal when the measurement value in the target monitoring mode is not within a preset range.

In the embodiment of the present application, the target signal in the target monitoring mode within the blanking interval can be acquired; the measurement value in the target monitoring mode is determined based on the target signal in the target monitoring mode within the blanking interval; the transceiver module of the LiDAR is determined to be abnormal when the measurement value in the target monitoring mode is not within the preset range. Therefore, the performance of the LiDAR is detected within the time interval of the completion of the scanning of each frame data by the LiDAR, so that the accuracy of the next scanning of the target object by the LiDAR is ensured. The performance of the LiDAR can be detected in real time by using the blanking interval in the detection period of the LiDAR, so that the problem that the system sends an alarm signal when the performance of the LiDAR is obviously degraded in the prior art is avoided.

In some embodiments, the target monitoring mode includes any one or more of a reference signal monitoring mode, a first optical preamble monitoring mode, or a second optical preamble monitoring mode.

In some embodiments, when the target monitoring mode is the reference signal monitoring mode:

the acquisition module 131 is configured to:

acquire a transmission reference signal in the reference signal monitoring mode within the blanking interval, wherein the reference signal monitoring mode is turning off lasers and optical receivers.

Determining a measurement value in the target monitoring mode based on the target signal in the target monitoring mode within the blanking interval comprises:

determining a first ranging value and/or a first waveform area value of the reference signal monitoring mode based on the transmission reference signal in the reference signal monitoring mode.

Determining that a transceiver module of the LiDAR is abnormal when the measurement value in the target monitoring mode is not within a preset range comprises:

determining that a transmitting circuit or a receiving circuit in the transceiver module fails when the first ranging value is not within a first preset distance range and/or the first waveform area value is not within a first preset area range.

In some embodiments, a receiving unit in the transceiver module includes a cancellation circuit.

When the target monitoring mode is the first optical preamble monitoring mode, the acquisition module 131 is configured to:

acquire a laser echo signal of the first optical preamble monitoring mode, wherein the first optical preamble monitoring mode is turning on the laser and turning off the cancellation circuit.

Determining a measurement value in the target monitoring mode based on the target signal in the target monitoring mode within the blanking interval comprises:

determining a second ranging value and/or a second waveform area value of the first optical preamble monitoring mode based on the laser echo signal of the first optical preamble monitoring mode.

Determining that a transceiver module of the LiDAR is abnormal when the measurement value in the target monitoring mode is not within a preset range comprises:

determining that the transceiver module is abnormal when the second ranging value is not within a second preset distance range and/or the second waveform area value is not within a second preset area range.

In some embodiments, a receiving unit in the transceiver module includes a cancellation circuit.

When the transceiver module is normal after the completion of the reference signal monitoring mode and the target monitoring mode is the first optical preamble monitoring mode, the acquisition module 131 is configured to:

acquire a laser echo signal of the first optical preamble monitoring mode, wherein the first optical preamble monitoring mode is turning on the laser and turning off the cancellation circuit.

Determining a measurement value in the target monitoring mode based on the target signal in the target monitoring mode within the blanking interval comprises:

determining a second ranging value and/or a second waveform area value of the first optical preamble monitoring mode based on the laser echo signal of the first optical preamble monitoring mode.

Determining that a transceiver module of the LiDAR is abnormal when the measurement value in the target monitoring mode is not within a preset range comprises:

determining that the laser and/or the optical receiving device in the transceiver module in the first optical preamble monitoring mode is abnormal when the second ranging value is not within a second preset distance range and/or the second waveform area value is not within a second preset area range.

In some embodiments, a receiving unit in the transceiver module includes a cancellation circuit.

When the target monitoring mode is the second optical preamble monitoring mode, the acquisition module 111 is configured to:

acquire a laser echo signal of the second optical preamble monitoring mode, wherein the second optical preamble monitoring mode is turning on the laser and turning on the cancellation circuit.

Determining a measurement value in the target monitoring mode based on the target signal in the target monitoring mode within the blanking interval comprises:

determining a third ranging value and/or a third waveform area value of the second optical preamble monitoring mode based on the laser echo signal of the second optical preamble monitoring mode.

Determining that a transceiver module of the LiDAR is abnormal when the measurement value in the target monitoring mode is not within a preset range comprises:

determining that the transceiver module is abnormal when the third ranging value is not within a third preset distance range and/or the third waveform area value is not within a third preset area range.

In some embodiments, a receiving unit in the transceiver module includes a cancellation circuit.

When the transceiver module is normal after the completion of the first optical preamble monitoring mode and the target monitoring mode includes the second optical preamble monitoring mode, the acquisition module 131 is configured to:

acquire a laser echo signal of the second optical preamble monitoring mode, wherein the second optical preamble monitoring mode is turning on the laser and turning on the cancellation circuit.

Determining a measurement value in the target monitoring mode based on the target signal in the target monitoring mode within the blanking interval comprises:

determining a third ranging value and/or a third waveform area value of the second optical preamble monitoring mode based on the laser echo signal of the second optical preamble monitoring mode.

Determining that a transceiver module of the LiDAR is abnormal when the measurement value in the target monitoring mode is not within a preset range comprises:

determining that the cancellation circuit in the receiving circuit fails when the third ranging value is not within a third preset distance range and/or the third waveform area value is not within a third preset area range.

In some embodiments, when the transceiver module is normal after the completion of the reference signal monitoring mode and the first optical preamble monitoring mode in sequence and the target monitoring mode is the second optical preamble monitoring mode, the acquisition module 131 is configured to:

acquire a laser echo signal of the second optical preamble monitoring mode, wherein the second optical preamble monitoring mode is turning on the laser and turning on the cancellation circuit.

Determining a measurement value in the target monitoring mode based on the target signal in the target monitoring mode within the blanking interval comprises:

determining a third ranging value and/or a third waveform area value of the second optical preamble monitoring mode based on the laser echo signal of the second optical preamble monitoring mode.

Determining that a transceiver module of the LiDAR is abnormal when the measurement value in the target monitoring mode is not within a preset range comprises:

determining that the cancellation circuit in the receiving circuit fails when the third ranging value is not within a third preset distance range and/or the third waveform area value is not within a third preset area range.

In some embodiments, in addition to the first determination module 132, the device also includes:

a third determination module, configured to determine that a transceiver module of the LiDAR is normal when the measurement value in the target monitoring mode is within a preset range;

a turning-off module, configured to acquire an ambient noise signal by turning off a laser of a transmitting circuit and a cancellation circuit of a receiving circuit in the transceiver module;

a fourth determination module, configured to determine the number of ambient light noise signals within a preset time; and a fifth determination module, configured to determine that a baseline voltage is abnormal when the number of the ambient light noise signals within the preset time is greater than a preset number threshold, wherein the baseline voltage is configured to indicate a voltage applied to the optical receiving device.

In some embodiments, the second determination module 133 includes:

an acquisition unit, configured to acquire a target signal in each time of a first preset number in the target monitoring mode and determine a measurement value of the target signal of each time; and a determination unit, configured to determine that the transceiver module of the LiDAR is abnormal when the total number of times the measurement value is not within the preset range is greater than a second preset number, wherein the first preset number is greater than the second preset number.

In some embodiments, in addition to the second determination module 133, the device also includes: a prompt module, configured to send a prompt signal.

It should be noted that, when the LiDAR performance detection device according to the above embodiments implements the LiDAR performance detection, only the division of the above functional modules is illustrated, and in practical applications, the above function distribution may be completed by different functional modules as needed; that is, the internal structure of the equipment is divided into different functional modules to complete all or part of the above described functions. In addition, the LiDAR performance detection device according to the above embodiments and the embodiment of the LiDAR performance detection belong to the same concept, and the detailed implementation process thereof is shown in the method embodiments, which is not repeated herein.

The above serial numbers of the embodiments of the present application are merely for description, and do not represent the advantages and disadvantages of the embodiments.

Figure 14:
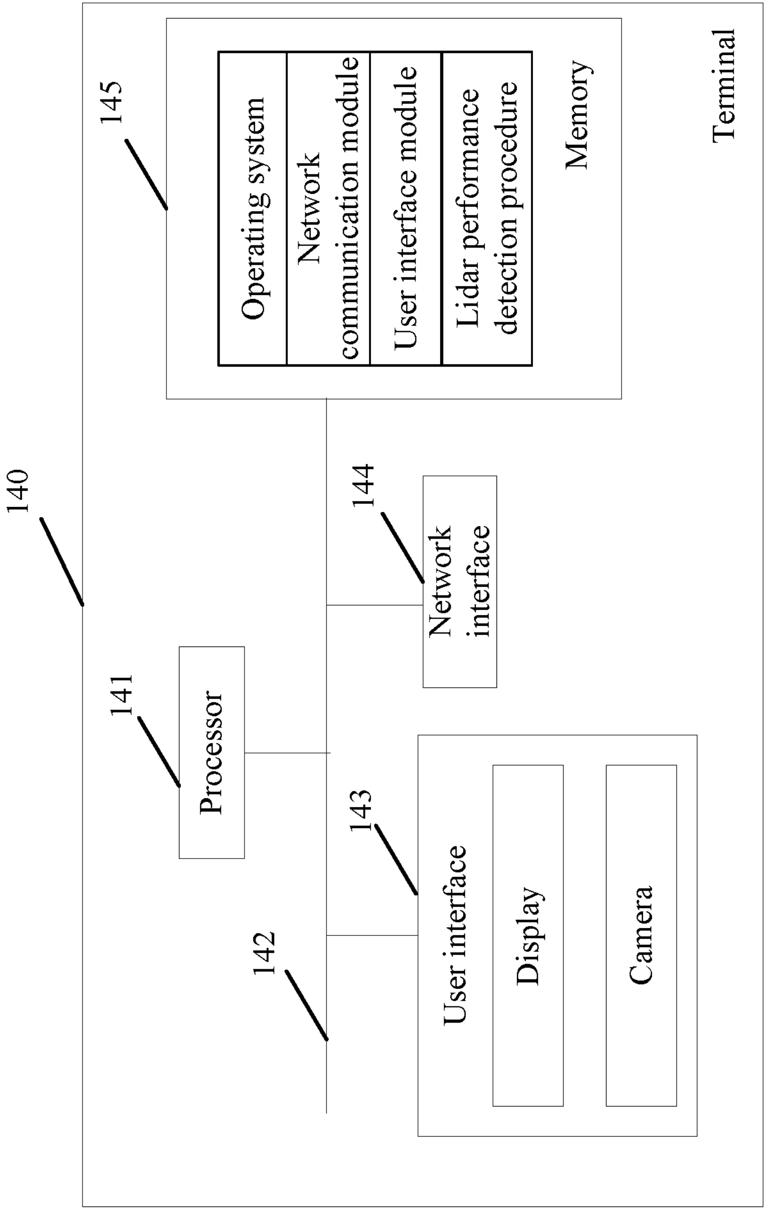
FIG. 14 is a schematic structural diagram of a terminal according to an embodiment of the present application.

Referring to FIG. 14, a schematic structural diagram of a terminal according to an embodiment of the present application is provided. As shown in FIG. 14, the terminal 140 may include: at least one processor 141, at least one network interface 144, a user interface 143, a memory 145, and at least one communication bus 142.

The communication bus 142 is configured to implement connection communication among these components.

The user interface 143 may include a display and a camera, and the user interface 143 may also include a standard wired interface and a wireless interface.

The network interface 144 may include a standard wired interface and a wireless interface (e.g., WI-FI interface).

The processor 141 may include one or more processing cores. The processor 141 connects all parts of the entire terminal 140 by utilizing various interfaces and circuits, implements various functions of the terminal 140, and processes data by running or executing instructions, programs, code sets, or instruction sets stored in the memory 145 and by calling data stored in the memory 145. In some embodiments, the processor 141 may be implemented in at least one hardware form of digital signal processing (DSP), field-programmable gate array (FPGA), or programmable logic array (PLA). The processor 141 may integrate one of or a combination of a central processing unit (CPU), a graphics processing unit (GPU), a modem, or the like. The CPU mainly processes an operating system, a user interface, an application program, or the like; the GPU is configured to render and draw the content required to be displayed by the display; the modem is configured to handle wireless communications. It can be understood that the above modem may not be integrated into the processor 141, and may be implemented by a single chip.

The memory 145 may include a random access memory (RAM) or a read-only memory. In some embodiments, the memory 145 includes a non-transitory computer-readable storage medium. The memory 125 may be configured to store an instruction, a program, a code, a code set, or an instruction set. The memory 145 may include a storage program area and a storage data area, wherein the storage program area may store instructions for implementing an operating system, instructions for at least one function (such as a touch function, a sound playing function, and an image playing function), instructions for implementing the above method embodiments, and the like; the storage data area may store data and the like referred to in the above method embodiments. The memory 145 may be at least one storage device located remotely from the processor 141. As shown in FIG. 14, the memory 145, as a computer storage medium, may include an operating system, a network communication module, a user interface module, and a mixer application program.

In the terminal 140 shown in FIG. 14, the user interface 143 is mainly configured as an interface for providing inputs for users and acquiring data input by users; the processor 141 may be configured to call the mixer application program stored in the memory 145, and the operations are performed as follows:

acquiring a target signal in a target monitoring mode within the blanking interval;

determining a measurement value in the target monitoring mode based on the target signal in the target monitoring mode within the blanking interval; and determining that a transceiver module of the LiDAR is abnormal when the measurement value in the target monitoring mode is not within a preset range.

In an embodiment, the target monitoring mode includes any one or more of a reference signal monitoring mode, a first optical preamble monitoring mode, or a second optical preamble monitoring mode.

In an embodiment, when the target monitoring mode is the reference signal monitoring mode, when acquiring a target signal in a target monitoring mode within the blanking interval, the processor 141 performs:

acquiring a transmission reference signal in the reference signal monitoring mode within the blanking interval, wherein the reference signal monitoring mode is to turn off a laser and an optical receiving device;

when determining a measurement value in the target monitoring mode based on the target signal in the target monitoring mode within the blanking interval, the processor 141 performs:

determining a first ranging value and/or a first waveform area value of the reference signal monitoring mode based on the transmission reference signal in the reference signal monitoring mode;

when determining that a transceiver module of the LiDAR is abnormal when the measurement value in the target monitoring mode is not within a preset range, the processor 141 performs:

determining that a transmitting circuit or a receiving circuit in the transceiver module fails when the first ranging value is not within a first preset distance range and/or the first waveform area value is not within a first preset area range.

In an embodiment, the receiving unit in the transceiver module includes a cancellation circuit;

when acquiring a target signal in a target monitoring mode within the blanking interval when the target monitoring mode is the first optical preamble monitoring mode, the processor 141 performs:

acquiring a laser echo signal of the first optical preamble monitoring mode, wherein the first optical preamble monitoring mode is turning on the laser and turning off the cancellation circuit;

when determining a measurement value in the target monitoring mode based on the target signal in the target monitoring mode within the blanking interval, the processor 141 performs:

determining a second ranging value and/or a second waveform area value of the first optical preamble monitoring mode based on the laser echo signal of the first optical preamble monitoring mode; and when determining that a transceiver module of the LiDAR is abnormal when the measurement value in the target monitoring mode is not within a preset range, the processor 141 performs:

determining that the transceiver module is abnormal when the second ranging value is not within a second preset distance range and/or the second waveform area value is not within a second preset area range.

In an embodiment, the receiving unit in the transceiver module includes a cancellation circuit;

when acquiring a target signal in a target monitoring mode within the blanking interval when the target monitoring mode is the second optical preamble monitoring mode, the processor 141 performs:

acquiring a laser echo signal of the second optical preamble monitoring mode, wherein the second optical preamble monitoring mode is turning on the laser and turning on the cancellation circuit;

when determining a measurement value in the target monitoring mode based on the target signal in the target monitoring mode within the blanking interval, the processor 141 performs:

determining a third ranging value and/or a third waveform area value of the second optical preamble monitoring mode based on the laser echo signal of the second optical preamble monitoring mode; and when determining that a transceiver module of the LiDAR is abnormal when the measurement value in the target monitoring mode is not within a preset range, the processor 141 performs:

determining that the transceiver module is abnormal when the third ranging value is not within a third preset distance range and/or the third waveform area value is not within a third preset area range.

In an embodiment, the receiving unit in the transceiver module includes a cancellation circuit;

when acquiring a target signal in a target monitoring mode within the blanking interval when the transceiver module is normal after the completion of the reference signal monitoring mode and the target monitoring mode is the first optical preamble monitoring mode, the processor 141 performs:

acquiring a laser echo signal of the first optical preamble monitoring mode, wherein the first optical preamble monitoring mode is turning on the laser and turning off the cancellation circuit;

determining a second ranging value and/or a second waveform area value of the first optical preamble monitoring mode based on the laser echo signal of the first optical preamble monitoring mode; and determining that a laser and/or an optical receiving device in the transceiver module is abnormal when the second ranging value is not within a second preset distance range and/or the second waveform area value is not within a second preset area range, then stopping the detection, and sending an abnormal signal; and determining that the laser and/or the optical receiving device in the transceiver module is normal when the second ranging value is within the second preset distance range and/or the second waveform area value is within the second preset area range; then continuing to detect the second optical preamble monitoring mode:

acquiring a laser echo signal of the second optical preamble monitoring mode, wherein the second optical preamble monitoring mode is turning on the laser and turning on the cancellation circuit;

determining a third ranging value and/or a third waveform area value of the second optical preamble monitoring mode based on the laser echo signal of the second optical preamble monitoring mode; and determining that the cancellation circuit in the receiving circuit fails when the third ranging value is not within a third preset distance range and/or the third waveform area value is not within a third preset area range, then stopping the detection, and sending an abnormal signal.

In an embodiment, the receiving unit in the transceiver module includes a cancellation circuit;

when acquiring a target signal in a target monitoring mode within the blanking interval when the transceiver module is normal after the completion of the first optical preamble monitoring mode and the target monitoring mode includes the second optical preamble monitoring mode, the processor 121 performs:

acquiring a laser echo signal of the second optical preamble monitoring mode, wherein the second optical preamble monitoring mode is turning on the laser and turning on the cancellation circuit;

when determining a measurement value in the target monitoring mode based on the target signal in the target monitoring mode within the blanking interval, the processor 141 performs:

determining a third ranging value and/or a third waveform area value of the second optical preamble monitoring mode based on the laser echo signal of the second optical preamble monitoring mode; and when determining that a transceiver module of the LiDAR is abnormal when the measurement value in the target monitoring mode is not within a preset range, the processor 141 performs:

determining that the cancellation circuit in the receiving circuit fails when the second ranging value is within the second preset distance range and/or the second waveform area value is within the second preset area range, and the third ranging value is not within the third preset distance range and/or the third waveform area value is not within the third preset area range.

In an embodiment, after determining a measurement value in the target monitoring mode, the processor 141 also performs:

determining that a transceiver module of the LiDAR is normal when the measurement value in the target monitoring mode is within a preset range;

after determining that a transceiver module of the LiDAR is normal, the processor 141 also performs:

acquiring an ambient noise signal by turning off a laser of a transmitting circuit and a cancellation circuit of a receiving circuit in the transceiver module;

determining the number of ambient light noise signals within a preset time; and determining that a baseline voltage is abnormal when the number of the ambient light noise signals within the preset time is greater than a preset number threshold, wherein the baseline voltage is configured to indicate a voltage applied to the optical receiving device.

In an embodiment, when determining that the transceiver module in the LiDAR is abnormal when the measurement value in the target monitoring mode is not within the preset range, the processor 141 performs:

acquiring a target signal in each time of a first preset number in the target monitoring mode and determining a measurement value of the target signal of each time; and determining that the transceiver module of the LiDAR is abnormal when the total number of times the measurement value is not within the preset range is greater than a second preset number, wherein the first preset number is greater than the second preset number.

In an embodiment, after determining that the transceiver module of the LiDAR is abnormal, the processor 141 also sends a prompt signal.

An embodiment of the present application also provides a computer-readable storage medium having an instruction stored thereon, wherein the instruction, when executed on a computer or a processor, causes the computer or the processor to implement one or more of the steps in the embodiments shown in FIG. 2, FIG. 4, FIG. 6, FIG. 8, FIG. 10, FIG. 11, and FIG. 12. The respective constituent modules of the above LiDAR performance detection device may be stored in the computer-readable storage medium if they are implemented in the form of software functional units and sold or used as independent products.

In the above embodiments, all or part of the implementation may be realized using software, hardware, firmware, or any combination thereof. The implementation, when realized using software, may be realized in whole or in part in the form of a computer program product. The computer program product includes one or more computer instructions. The procedures or functions described in accordance with the embodiments of the present application are all or partially generated when the computer program instructions are loaded and executed on a computer. The computer may be a general-purpose computer, a special-purpose computer, a computer network, or other programmable devices. The computer instructions may be stored on or transmitted over a computer-readable storage medium. The computer instructions may be transmitted from one website, computer, server, or data center to another website, computer, server, or data center in a wired (e.g., coaxial cable, fiber optic, and digital subscriber line (DSL)) or wireless (e.g., infrared, wireless, and microwave) manner. The computer-readable storage medium may be any available medium that can be accessed by a computer or data storage equipment, such as a server or a data center, which includes one or more available media. The available medium may be a magnetic medium (e.g., a soft disk, a hard disk, or a magnetic tape), an optical medium (e.g., a digital versatile disc (DVD)), or a semiconductor medium (e.g., a solid state disk (SSD)), or the like.

It can be understood by those of ordinary skill in the art that all or a part of the procedures of the methods in the embodiments described above may be implemented by a computer program instructing relevant hardware. The program may be stored in a computer-readable storage medium; and the program, when executed, may include the procedures in the embodiments of the methods described above. The aforementioned storage medium includes a read-only memory (ROM), a random access memory (RAM), a magnetic disk, an optical disk, or other media capable of storing program codes. The embodiments and technical features thereof in the present application may be combined with one another without conflict.

The above embodiments are only exemplary embodiments of the present application, and are not intended to limit the scope of the present application. Various modifications and improvements made to the technical solutions of the present application by those skilled in the art without departing from the design spirit of the present application should fall within the protection scope defined by the claims of the present application.

What is claimed is:

1. A method for LiDAR performance detection, applied to a blanking interval, wherein the blanking interval is a time interval from a completion of scanning of first frame data to a beginning of scanning of second frame data by a LiDAR, the method comprises:

acquiring a target signal in a target monitoring mode within the blanking interval;

determining a measurement value in the target monitoring mode based on the target signal; and determining that a transceiver module of the LiDAR is abnormal when the measurement value in the target monitoring mode is not within a preset range, wherein the target monitoring mode comprises any one or more of the following:

a reference signal monitoring mode in which lasers and optical receivers of the transceiver module are turned off and whether a transmitting circuit and a receiving circuit of the transceiver module are conducted normally is determined;

a first optical preamble monitoring mode in which the lasers are turned on and a cancellation circuit is turned off and whether a transmitting circuit, a laser, a receiving circuit, and an optical receiver of the transceiver module are abnormal is determined, wherein the cancellation circuit is configured to reduce an effect of ambient light noise signals on laser echo signals; or a second optical preamble monitoring mode in which the lasers and the cancellation circuit are turned on and whether the transceiver module is abnormal is determined.

2. The method according to claim 1, wherein the target monitoring mode is the reference signal monitoring mode, the acquiring a target signal in a target monitoring mode within the blanking interval comprises:

acquiring a transmission reference signal in the reference signal monitoring mode within the blanking interval;

the determining a measurement value in the target monitoring mode based on the target signal in the target monitoring mode within the blanking interval comprises:

determining at least one of a first ranging value or a first waveform area value in the reference signal monitoring mode based on the transmission reference signal in the reference signal monitoring mode; and the determining that a transceiver module of the LiDAR is abnormal when the measurement value in the target monitoring mode is not within a preset range comprises:

determining that a transmitting circuit, a receiving circuit, or both in the transceiver module fail when either the first ranging value is not within a first preset distance range or the first waveform area value is not within a first preset area range.

3. The method according to claim 2, wherein a receiving unit in the transceiver module comprises a cancellation circuit, and the transmitting circuit and the receiving circuit in the transceiver module is determined to be normal when the first ranging value is within the first preset distance range or the first waveform area value is within the first preset area range, and wherein after the transmitting circuit or the receiving circuit in the transceiver module is determined to be normal, the method further comprises:

acquiring a laser echo signal in the first optical preamble monitoring mode, wherein the first optical preamble monitoring mode is turning on the lasers and turning off the cancellation circuit;

determining at least one of a second ranging value or a second waveform area value in the first optical preamble monitoring mode based on the laser echo signal in the first optical preamble monitoring mode; and determining that the lasers, the optical receivers, or both are abnormal when either the second ranging value is not within a second preset distance range or the second waveform area value is not within a second preset area range.

4. The method according to claim 3, wherein the lasers and the optical receivers are determined to be normal when either the second ranging value is within the second preset distance range or the second waveform area value is within the second preset area range, and wherein after the laser or the optical receiving device is determined to be normal, the method further comprises:

acquiring a laser echo signal in the second optical preamble monitoring mode, wherein the second optical preamble monitoring mode is turning on the lasers and the cancellation circuit;

determining at least one of a third ranging value or a third waveform area value in the second optical preamble monitoring mode based on the laser echo signal in the second optical preamble monitoring mode; and determining that the cancellation circuit is abnormal when either the third ranging value is not within a third preset distance range or the third waveform area value is not within a third preset area range.

5. The method according to claim 1, wherein a receiving circuit in the transceiver module comprises the cancellation circuit, and wherein the target monitoring mode is the first optical preamble monitoring mode, the acquiring a target signal in a target monitoring mode within the blanking interval comprises:

acquiring a laser echo signal in the first optical preamble monitoring mode;

the determining a measurement value in the target monitoring mode based on the target signal in the target monitoring mode within the blanking interval comprises:

determining at least one of a second ranging value or a second waveform area value in the first optical preamble monitoring mode based on the laser echo signal in the first optical preamble monitoring mode; and the determining that a transceiver module of the LiDAR is abnormal when the measurement value in the target monitoring mode is not within a preset range comprises:

determining that the transceiver module is abnormal when either the second ranging value is not within a second preset distance range or the second waveform area value is not within a second preset area range.

6. The method according to claim 5, further comprising:

determining the transceiver module to be normal in a first optical preamble mode when either the second ranging value is within the second preset distance range or the second waveform area value is within the second preset area range;

acquiring a laser echo signal in the second optical preamble monitoring mode, wherein the second optical preamble monitoring mode is turning on the laser and turning on the cancellation circuit;

determining at least one of a third ranging value or a third waveform area value of the second optical preamble monitoring mode based on the laser echo signal of the second optical preamble monitoring mode; and determining the cancellation circuit in the receiving circuit to be abnormal when either the third ranging value is not within a third preset distance range or the third waveform area value is not within a third preset area range.

7. The method according to claim 1, wherein a receiving unit in the transceiver module comprises the cancellation circuit, and wherein the target monitoring mode is the second optical preamble monitoring mode, the acquiring a target signal in a target monitoring mode within the blanking interval comprises:

acquiring a laser echo signal in the second optical preamble monitoring mode;

the determining a measurement value in the target monitoring mode based on the target signal in the target monitoring mode within the blanking interval comprises:

determining at least one of a third ranging value or a third waveform area value in the second optical preamble monitoring mode based on the laser echo signal in the second optical preamble monitoring mode; and the determining that a transceiver module of the LiDAR is abnormal when the measurement value in the target monitoring mode is not within a preset range comprises:

determining that the transceiver module is abnormal when either the third ranging value is not within a third preset distance range or the third waveform area value is not within a third preset area range.

8. The method according to claim 1, wherein the transceiver module of the LiDAR is determined to be normal when the measurement value in the target monitoring mode is within the preset range, and after the transceiver module of the LiDAR is determined to be normal, the method further comprises:

acquiring an ambient noise signal after turning off lasers of a transmitting circuit and a cancellation circuit of a receiving circuit in the transceiver module;

determining a number of ambient noise signals within a preset time; and determining that a baseline voltage is abnormal when the number of the ambient noise signals within the preset time is greater than a preset number threshold, wherein the baseline voltage is a voltage applied to optical receivers of the transceiver module.

9. The method according to claim 1, wherein the determining that a transceiver module of the LiDAR is abnormal when the measurement value in the target monitoring mode is not within a preset range comprises:

acquiring a target signal in each time of a first preset number in the target monitoring mode, and determining a measurement value of the target signal; and determining that the transceiver module of the LiDAR is abnormal when a total number of the measurement value is not within the preset range and is greater than a second preset number, wherein the first preset number is greater than the second preset number.

10. A non-transitory computer storage medium having a plurality of instructions stored thereon, wherein the instructions, when executed by a processor, cause the processor to implement the method according to claim 1.

11. A terminal comprising a processor and a memory, wherein the memory has a computer program stored thereon, and the computer program, when executed by the processor, causes the processor to implement the method according to claim 1.

12. A device for LiDAR performance detection, applied to a blanking interval, wherein the blanking interval is a time interval from a completion of scanning of first frame data to a beginning of scanning of second frame data by a LiDAR, the device comprises:

an acquisition module, configured to acquire a target signal in a target monitoring mode within the blanking interval;

a first determination module, configured to determine a measurement value in the target monitoring mode based on the target signal; and a second determination module, configured to determine that a transceiver module of the LiDAR is abnormal when the measurement value in the target monitoring mode is not within a preset range, wherein the target monitoring mode comprises any one or more of the following:

a reference signal monitoring mode in which lasers and optical receivers of the transceiver module are turned off and whether a transmitting circuit and a receiving circuit of the transceiver module are conducted normally is determined;

a first optical preamble monitoring mode in which the lasers are turned on and a cancellation circuit is turned off and whether a transmitting circuit, a laser, a receiving circuit, and an optical receiver of the transceiver module are abnormal is determined, wherein the cancellation circuit is configured to reduce an effect of ambient light noise signals on laser echo signals; or a second optical preamble monitoring mode in which the lasers and the cancellation circuit are turned on and whether the transceiver module is abnormal is determined.

* * * * *